US006035009A

United States Patent [19]

Shudo

[11] Patent Number: 6,035,009
[45] Date of Patent: Mar. 7, 2000

[54] APPARATUS FOR PROCESSING AUDIO SIGNAL

[75] Inventor: Katsuyuki Shudo, Yokosuka, Japan

[73] Assignee: Victor Company of Japan, Ltd., Yokohama, Japan

[21] Appl. No.: 08/938,517

[22] Filed: Sep. 26, 1997

[51] Int. Cl.[7] .............................. H04L 25/36; G11B 5/09; G10L 3/02

[52] U.S. Cl. .............................. 375/372; 369/47; 704/207

[58] Field of Search .............................. 375/372, 371; 369/32, 47, 59; 704/503, 200, 207, 210

[56] References Cited

U.S. PATENT DOCUMENTS

| | | | |
|---|---|---|---|
| 4,121,058 | 10/1978 | Jusko et al. | 179/15.55 |
| 4,841,574 | 6/1989 | Pham et al. | 381/31 |
| 5,097,459 | 3/1992 | Yoshio | 369/48 |
| 5,530,762 | 6/1996 | John, Jr. et al. | 381/63 |
| 5,611,018 | 3/1997 | Tanaka et al. | 395/2.24 |
| 5,842,169 | 11/1998 | Sakashita | 704/278 |
| 5,848,392 | 12/1998 | Shudo | 704/503 |

FOREIGN PATENT DOCUMENTS

| | | |
|---|---|---|
| WO92/06467 | 4/1992 | European Pat. Off. . |
| 0534410 | 3/1993 | European Pat. Off. . |
| 0652560 | 5/1995 | European Pat. Off. . |
| 0702354 | 3/1996 | European Pat. Off. . |
| 03205656A | 9/1991 | Japan . |
| 7-120158 | 12/1995 | Japan . |
| 8-195028 | 7/1996 | Japan . |

*Primary Examiner*—Chi H. Pham
*Assistant Examiner*—Khai Tran
*Attorney, Agent, or Firm*—Jacobson, Price, Holman & Stern, PLLC

[57] ABSTRACT

An apparatus for processing audio signals is provided with a memory for storing the audio signals. The audio signals are written in the memory at write addresses in the memory. The audio signals are read from the memory in accordance with reading addresses at a speed lower than a speed for writing the audio signals into the memory. It is determined whether an amount of audio signals stored in the memory and not yet read therefrom is increasing. The write addresses are then updated when the amount of audio signals not yet read is increasing. When small signals levels of which are lower than a reference level are detected among the audio signals, updating of the write addresses of the small signals may be halted.

16 Claims, 14 Drawing Sheets

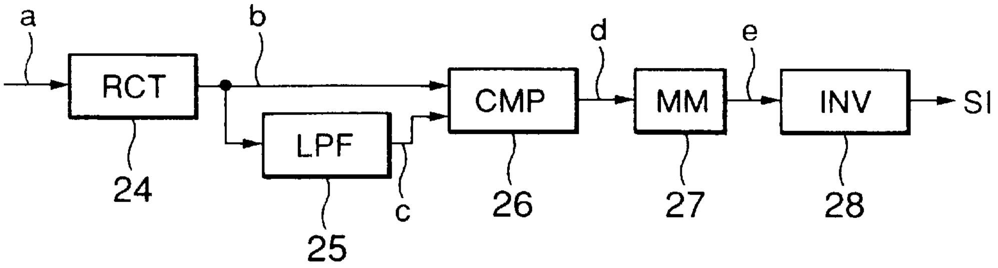
FIG.7
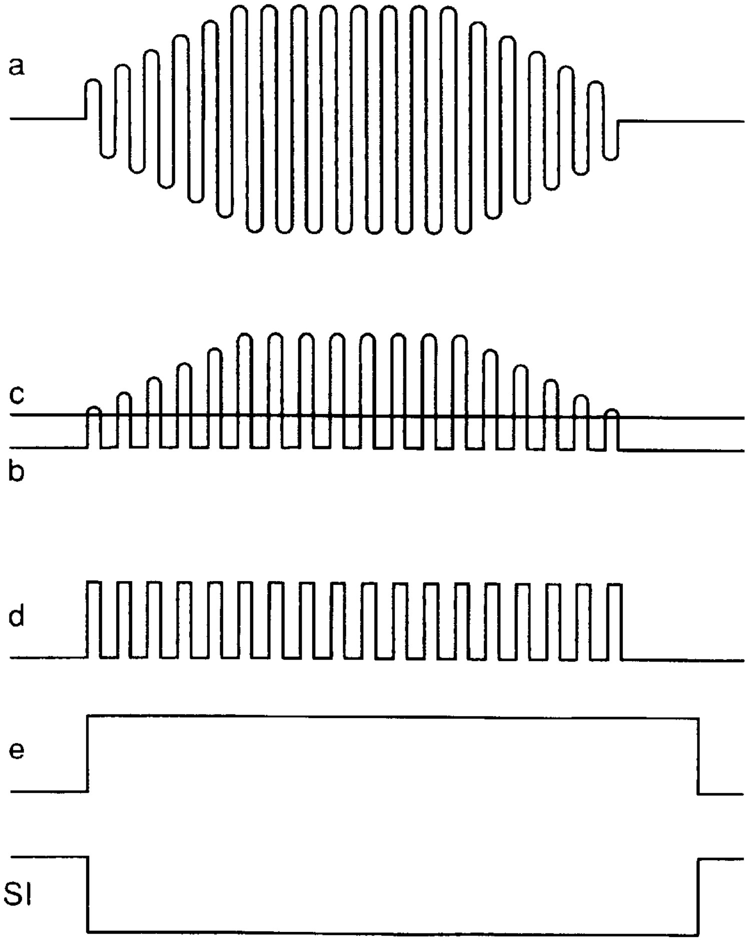
FIG.8A
FIG.8B
FIG.8C
FIG.8D
FIG.8E

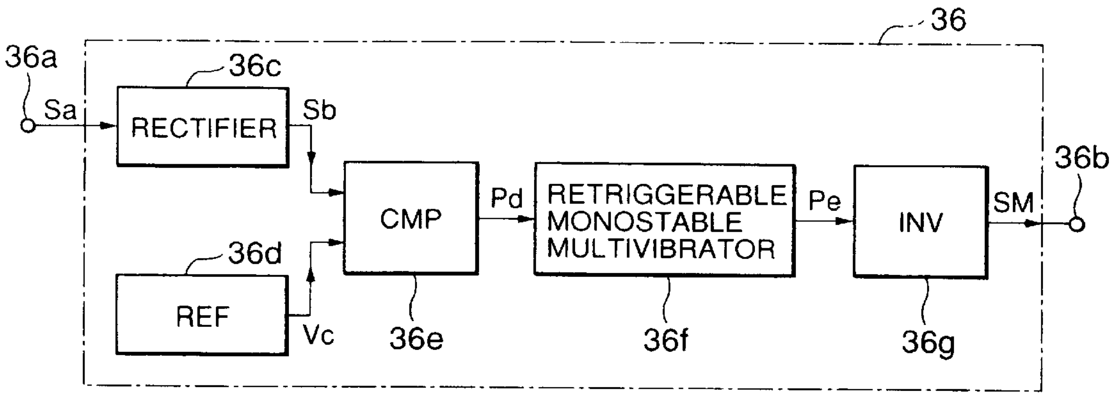
FIG.12
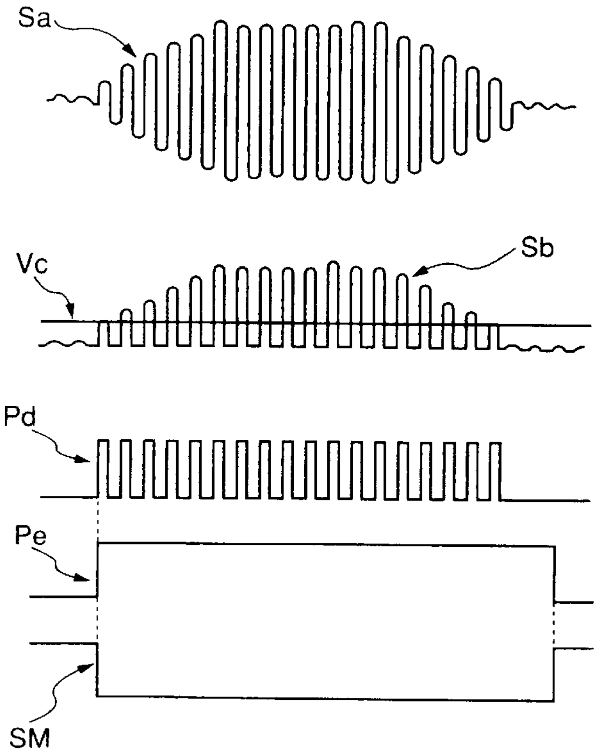
FIG.13A
FIG.13B
FIG.13C
FIG.13D
FIG.13E

WAD RAD
MAX
MIN
ADDRESS
a b c d e f g h i j k l m n o p q r s t u v w x y z a' b' c'
SM
SMu
SMd
EQ
Pw
PRS
Ps2
WEN
Pwt
PR
t1 t2 t3 t4 t5 t6 t7 t8 t9
t

WAD
RAD
MAX
MIN
ADDRESS
a1
b1
c1
d1
e1
f1
g1
h1
i1
j1
k1
l1
m1
n1
o1
p1
q1
s1
t1
u1
SM
SMu
SMd
UP
LW
Pw
Ps2
Pr2
WEN
Pwt
PRx
PRS
PR
t1
t2
t3
t4
t5
t6
t7
t8
t

WAD
RAD
MAX
MIN
ADDRESS
a2
b2
c2
d2
e2
f2
g2
h2
i2
j2
k2
l2
m2
n2
o2
p2
q2
r2
s2
t2
u2
v2
w2
x2
y2
z2
a2'
b2'

SM

SMu

SMd

EQ

Pw

PRS

Ps2

WEN

Pwt

PR
t1
t2
t3
t4
t5
t6
t7
t8
t9
t

APPARATUS FOR PROCESSING AUDIO SIGNAL

BACKGROUND OF THE INVENTION

1. Field of the Invention

The present invention relates to an apparatus for processing audio signals. Particularly, this invention relates to an apparatus that processes high pitch audio signals for easier listening.

2. Description of the Related Art

There are demands for rapid reproduction of audio signals from a recording medium, such as a magnetic tape by a reproducing apparatus, such as a video tape recorder (VTR) under the condition that the reproducing tape speed is higher than the recording tape speed.

In such reproduction, a relative speed between a recording/reproducing head and a recording tape becomes higher than that in recording. This results in higher reproduced audio signal frequency than recording audio signal frequency with listening difficulty.

Some apparatuses have been introduced that resolve such a difficulty by rapidly sampling audio signals reproduced from a magnetic tape and writing them into a semiconductor memory and quickly reading them to obtain a lower reproduced signal frequency than a recording signal frequency for easier listening.

Such apparatuses are disclosed in Japanese Patent No. 7(1995)-120158 and Japanese Patent Laid-Open No. 3(1991)-205656. In the disclosed apparatuses, audio signals of a predetermined quantity (one block) are rapidly sampled, written in a semiconductor memory and then quickly read therefrom.

The apparatus disclosed in the former Japanese Patent is to resolve the following problem: One block data quantity is usually a storage capacity of a semiconductor memory. Audio signals are written in the memory as a continuous signal without intermission from the minimum to the maximum memory addresses. This results in listening difficulty due to short one–block length and short time for continues listening without memory of huge storage capacity.

Further, the apparatus disclosed in the latter Japanese Laid-Open Patent is to inhibit memory writing at silent portions by removing those portions from audio signals for easier listening of continuous sound. This is accomplished by halting advances in reading address when a writing address and a reading address become identical to each other at silent portions.

However, in these apparatuses, new memory writing is sometimes never carried out due to halting of the advance in reading address under identicalness of the writing and reading addresses. This will happen even not at the silent portions in the latter apparatus. And, this results in repeating of reading data that has been already read from the memory, thus causing listening difficulty. Such difficulty will be caused when address writing and reading clock timings are not matched each other or the number "M" of M-speed reproduction is not an integral number.

SUMMARY OF THE INVENTION

A purpose of the invention is to provide an audio signal processor for easier listening in rapid reproduction of audio signals from a recording medium, especially efficiently and naturally removing small sound portions.

The present invention provides an apparatus for processing audio signals comprising: a memory for storing the audio signals; writing means for writing the audio signals in the memory at write addresses in the memory; reading means for reading the audio signals in accordance with reading addresses from the memory at a speed lower than a speed for writing the audio signals into the memory by the writing means; determining means for determining whether an amount of audio signals stored in the memory and not yet read by the reading means is increasing; and updating means for updating the write addresses when the amount of audio signals not yet read by the reading means increasing.

Further, the present invention provides an apparatus for processing audio signals comprising: a memory for storing the audio signals; writing means for writing the audio signals in the memory at write addresses in the memory; reading means for reading the audio signals in accordance with reading addresses from the memory at a speed lower than a speed for writing the audio signals into the memory by the writing means; and detecting means for detecting small signals among the audio signals, levels of the small signals being lower than a reference level, to halt updating of write addresses of the small signals.

BRIEF DESCRIPTION OF THE DRAWINGS

FIG. 7 is the block diagram showing the silence detector in the third embodiment;

FIGS. 8A to 8E are illustrations showing signal waveforms at respective stages of the silence detector shown in FIG. 6;

FIG. 12 is the block diagram showing the small sound detector in the fifth embodiment;

FIGS. 13A to 13E are illustrations showing signal waveforms at respective stages of the small sound detector shown in FIG. 12;

DETAILED DESCRIPTION OF THE PREFERRED EMBODIMENTS

Figure 1:
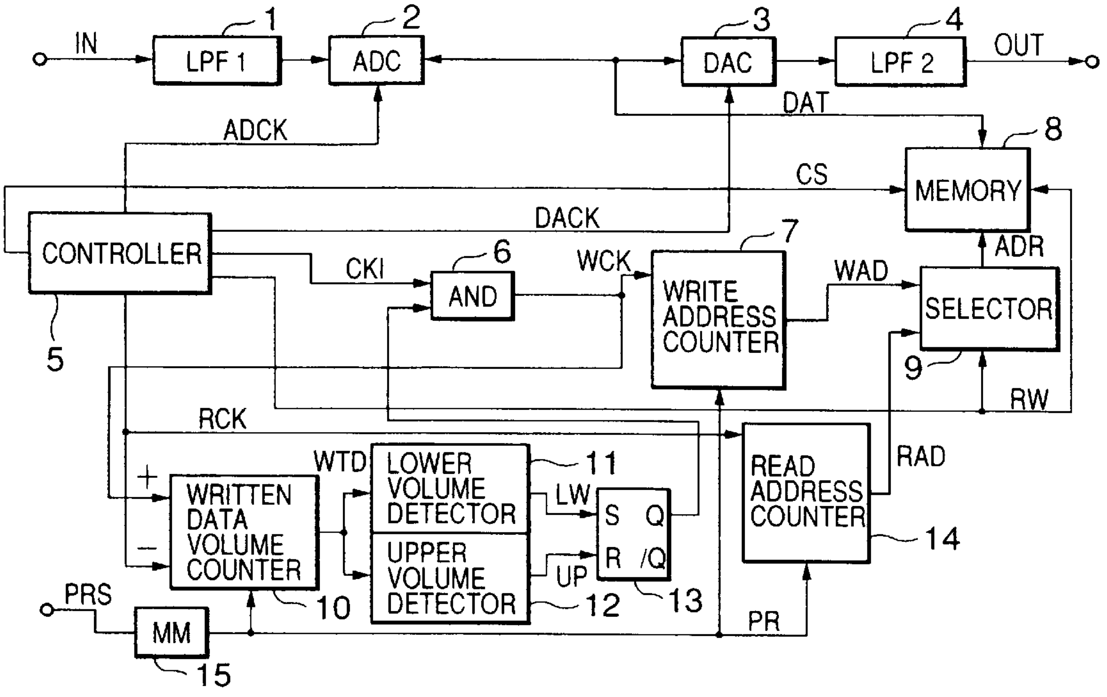
FIG. 1 is the block diagram showing the first embodiment of the audio signal processor according to the present invention.

FIG. 1 is the block diagram showing the first embodiment of the apparatus for processing an audio signal.

In FIG. 1, an audio signal that has been reproduced by high-speed reproduction is input to an analog-to-digital (AD) converter (ADC) 2 via low-pass filter (LPF1) 1 from an input terminal IN. The AD converter 2 converts the input signal by high-speed AD conversion into digital data at a predetermined timing, to write the converted digital data in a memory 8. The written data are read out from the memory 8 at a pre-determined timing and then converted into an analog signal by a digital-to-analog (DA) converter (DAC) 3, to be output from an output terminal OUT via low-pass filter (LPF2) 4.

A controller 5 generates a clock signal CK1 as the reference of a clock signal WCK of a write address counter 7, a clock signal RCK of a read address counter 14, a write/read selection signal RW, a memory control signal CS, an AD conversion clock signal ADCK and a DA clock signal DACK.

A selector 9 selects a read address RAD when the write/read selection signal RW is HIGH, on the other hand, a write address WAD when the signal RW is LOW. When a preset signal PR becomes HIGH, the write and the read address counters 7 and 14 take respective predetermined values and supply the write and the read addresses WAD and RAD to the selector 9, respectively. Here, the expressions, such as "a signal is HIGH/LOW" means "a signal level is high/low".

A written (unread) data volume counter 10 having presettable up/down counters outputs written (unread) data volume WTD to a lower volume detector 11 and an upper volume detector 12. Here, the written (unread) data are data not yet read out among the data which have been written in the memory 8.

In the first embodiment, the unread data volume WTD is always controlled so as not to exceed a predetermined range. In detail, the lower volume detector 11 determines whether the volume WTD enters a predetermined lower limit range. On the other hand, the upper volume detector 12 determines whether the volume WTD enters a predetermined upper limit range.

The memory 8 may be an 8×32 Kbits memory and have 15-bit addresses. Then, the lower volume detector 11 outputs a high LW signal when the high-order 8 bits of the total 15 bits of data addresses of the memory 8 become 00000000. On the contrary, the upper volume detector 12 outputs an UP signal of high level when the high-order 8 bits of the 15 bits become 11111110.

An RS flip-flop 13 is set by the LW signal, on the other hand, reset by the UP signal. When the output Q of the flip-flop 13 is HIGH, this indicates that the unread data volume WTD is adequate since the start of new writing. On the contrary, when the output Q is LOW, this indicates that the volume WTD exceeds a predetermined range. In the latter case, writing is inhibited until the volume WTD is reduced into adequate range. This action prevents block length (a predetermined quantity of audio signal) from shortening.

Figure 2:
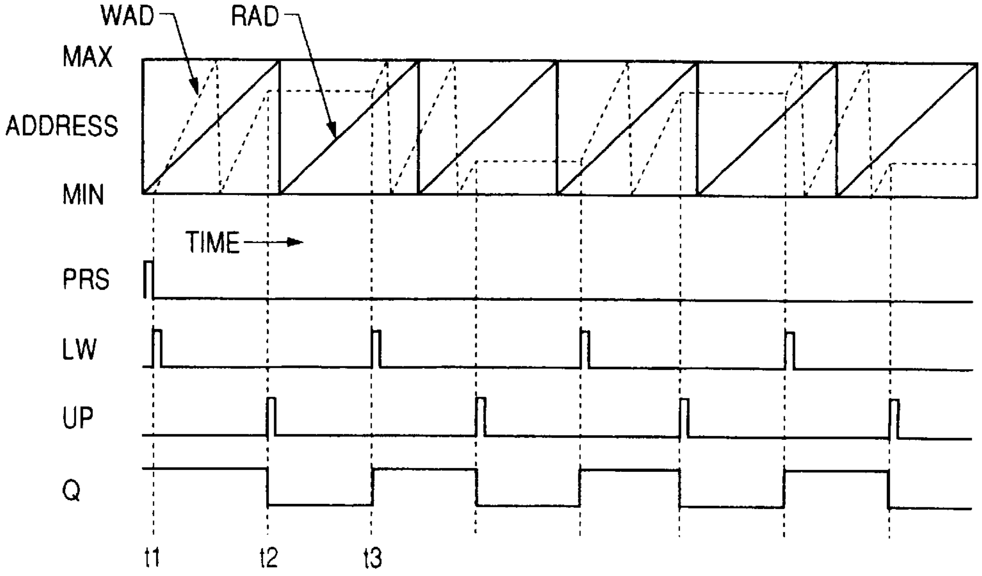
FIG. 2 is an illustration showing the address transition process of the memory and timing charts for the first embodiment.

FIG. 2 is an illustration showing the address transition process of the memory 8 and its timing chart in the case of double-speed processing (M=2) in the first embodiment.

As shown in FIG. 2, when starting new operation, a pulse PRS is supplied to a monomultiplier (MM) 15 of FIG. 1, an output signal PR of which is supplied as a preset pulse to the write and the read address counters 7 and 14. In this embodiment, the minimum value "0" is loaded to each counter as a preset value, however, the counters 7 and 14 may be loaded with any same value.

When presetting, the unread data volume WTD becomes "0" and then the LW signal becomes HIGH. The flip-flop 13 is then set at time t1. The output Q of the flip-flop 13 becomes HIGH, so that the clock signal CK1 is changed to a signal WCK via AND gate 6. The signal WCK is input to the write address counter 7 and the addition input terminal of the written data volume counter 10.

The write address WAD is updated at a speed twice of updating on the read address RAD, to perform pitch conversion. When the updating on the write address WAD advances and hence the written (unread) data volume WTD falls in the predetermined range (111111100000000–111111101111111), the output signal UP of the upper volume detector 12 becomes HIGH.

In normal operation, since the high-order 8 bits are checked, the output signal UP becomes HIGH when the unread data volume WTD is 111111100000000. Even if clock input becomes unstable in the vicinity of the volume=111111100000000, the above range check makes the operation stable.

Further, even in the worst case where the data volume becomes out of range, this results in the repetition of flip-flop (13) resetting, thus imposing no adverse affection to the output thereof.

When the RS flip-flop 13 is reset, its output Q becomes LOW at time t2 and the AND gate 6 does not output the signal WCK, thus stopping the counting operation of the write address counter 7. However, the signal RCK is input to the read address counter 14 continuously, so that the remaining unread data volume WTD begins to decrease. Then, at time t3, when the high-order 8 bits of the volume WTD becomes 00000000, the output signal LW of the lower volume detector 11 changes to HIGH. The signal LW will become HIGH on condition that the unread data volume WTD enters the range (000000000000000–000000001111111), but in normal operation, The signal LW of high level is detected at the volume WTD "000000001111111". Even if clock becomes unstable in the vicinity of "000000001111111", the signal LW of high level is checked in the above range, so that the operation is stable. Further, even in the worst case where the data volume becomes out of range, this results in the repetition of flip-flop (13) resetting, thus imposing no adverse affection to the output thereof. Therefore, even in a case of non-integer M, successful operation can be expected.

Figure 3:
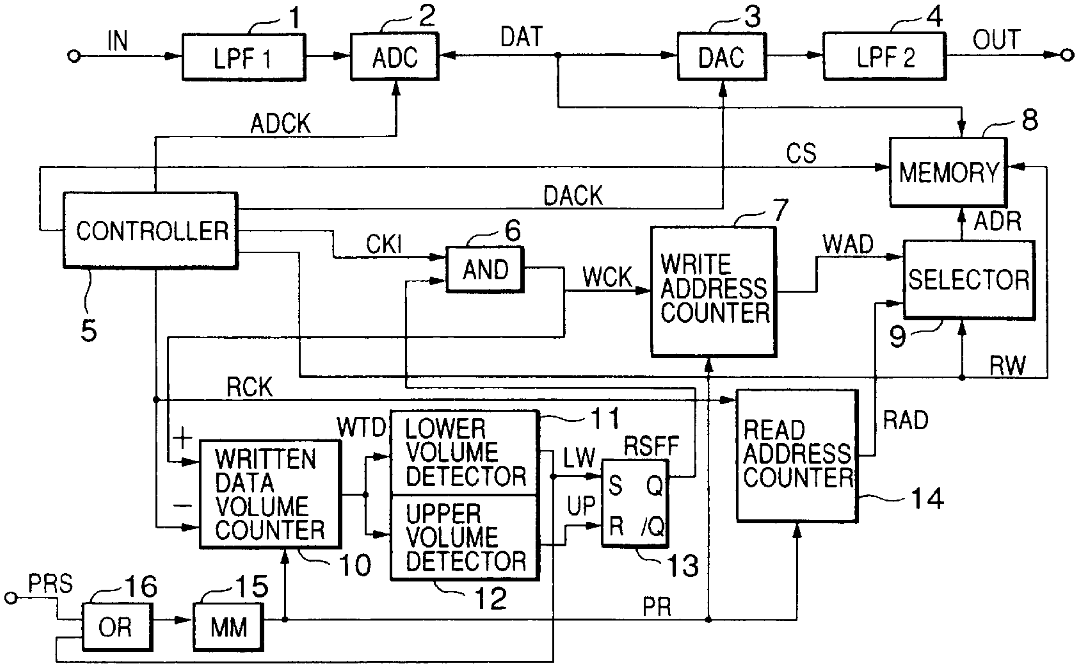
FIG. 3 is the block diagram showing the second embodiment of the audio signal processor according to the present invention.

FIG. 3 is the block diagram showing the second embodiment of the audio signal processor according to the invention. In FIG. 3, the difference from the first embodiment shown in FIG. 1 is how to generate the preset signal PR. In detail, the preset signal PR is generated not only by the pulse PRS but also by the output signal LW of the lower volume detector 11 via OR gate 16.

Figure 4:
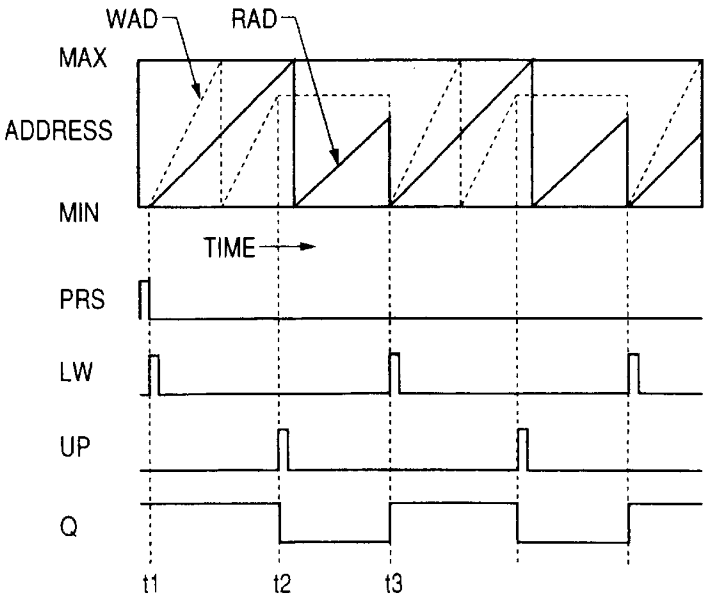
FIG. 4 is an illustration showing the address transition process of the memory and timing charts for the second embodiment.

FIG. 4 is an illustration showing the address transition process of the memory and its time chart in the case of double-speed processing (M=2) according to the second embodiment.

A new operation starts at the leading edge of pulse PRS as shown in FIG. 4, and preset pulse PR is applied to the write and the read address counters 7 and 14, and the written data volume counter 10. In this embodiment, the minimum value "0" is loaded to each counter as a preset value, however, the counters 7 and 14 may be loaded with any same value.

When presetting, the unread data volume WTD becomes zero and the output signal LW of the lower volume detector 11 becomes HIGH, and the RS flip-flop 13 is set at time t1. Then, the output Q of the flip-flop 13 becomes HIGH, the clock CK1 is changed to the signal WCK via AND gate 6, and the signal WCK is input to the addition input terminal of the written data volume counter 10 and the write address counter 7.

The write address WAD is updated at a speed twice of updating on the read address RAD, to perform pitch conversion. When the updating on the write address WAD advances and hence the written (unread) data volume WTD falls in the predetermined range (111110000000–111111101111111), the output signal UP of the upper volume detector 12 becomes HIGH.

In normal operation, since the high-order 8 bits are checked, the output signal UP becomes HIGH when the unread data volume WTD is 111111100000000. Even if clock input becomes unstable in the vicinity of the volume= 111111100000000, the above range check makes the operation stable.

Further, even in the worst case where the data volume becomes out of range, this results in the repetition of flip-flop (13) resetting, thus imposing no adverse affection to the output thereof.

When the flip-flop 13 is reset at time t2, its output Q becomes LOW so as not to output the signal WCK from the AND gate 6.

However, the signal RCK is input to the read address counter 14 continuously, so that the remaining unread data volume WTD begins to decrease. Then, at time t3, when the high-order 8 bits of the volume WTD becomes 00000000, the output signal LW of the lower volume detector 11 changes to HIGH. The output signal LW becomes HIGH on condition that the unread data volume WTD enters the range (000000000000000–000000001111111), however, in normal operation, the signal LW of high level is detected at the volume WTD "000000001111111". Even if clock becomes unstable in the vicinity of "000000001111111", the signal LW of high level is checked in the above range, so that the operation is stable. Further, even in the worst case where the data volume becomes out of range, this results in the repetition of flip-flop (13) resetting, thus imposing no adverse affection to the output thereof.

At the same time, the output signal LW becomes the preset signal PR via OR gate 16 and monomultiplier 15 to preset the written data volume counter 10, and the write and the read address counters 7 and 14. This action makes the initial condition of the audio signal processor shown in FIG. 3.

Figure 5:
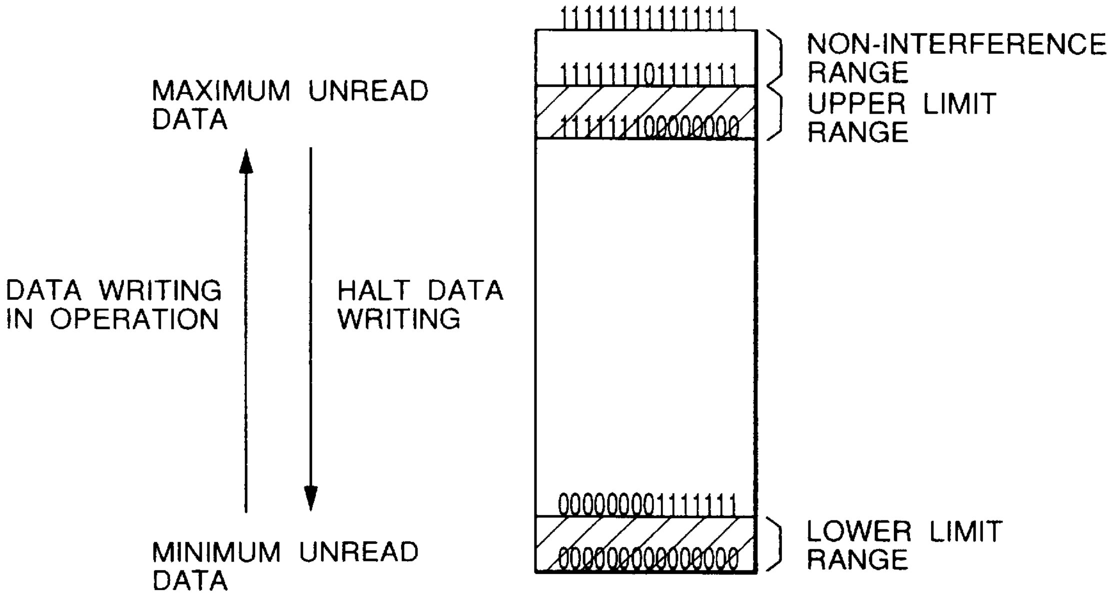
FIG. 5 is an illustration showing address control according to the present invention.

FIG. 5 is an illustration showing an example of the address control pattern related to the present invention:

As shown in FIG. 5, the memory address control according to the embodiment is performed by providing a non-interference range in between the upper limit range and the maximum of the unread data. In other words, even when some factors, such as, clock timing initiates the clock RCK to be input to the written data volume counter 10 at volume "0", this non-interference range prevents the data volume from entering the upper limit range so soon, thereby causing the output signal UP of the upper volume detector 12 so as not to become HIGH, thus maintaining a stable operation. This achieves successful pitch conversion without malfunction.

The second embodiment shown in FIG. 3 is characterized in that: In a case of unstable power supply, or even in a case where noise impinges on clock signal lines, since presetting is made per block (a predetermined quantity of audio signal), any counting error of the written data volume counter 10 is not accumulated, so that a further stable operation can be expected.

Figure 6:
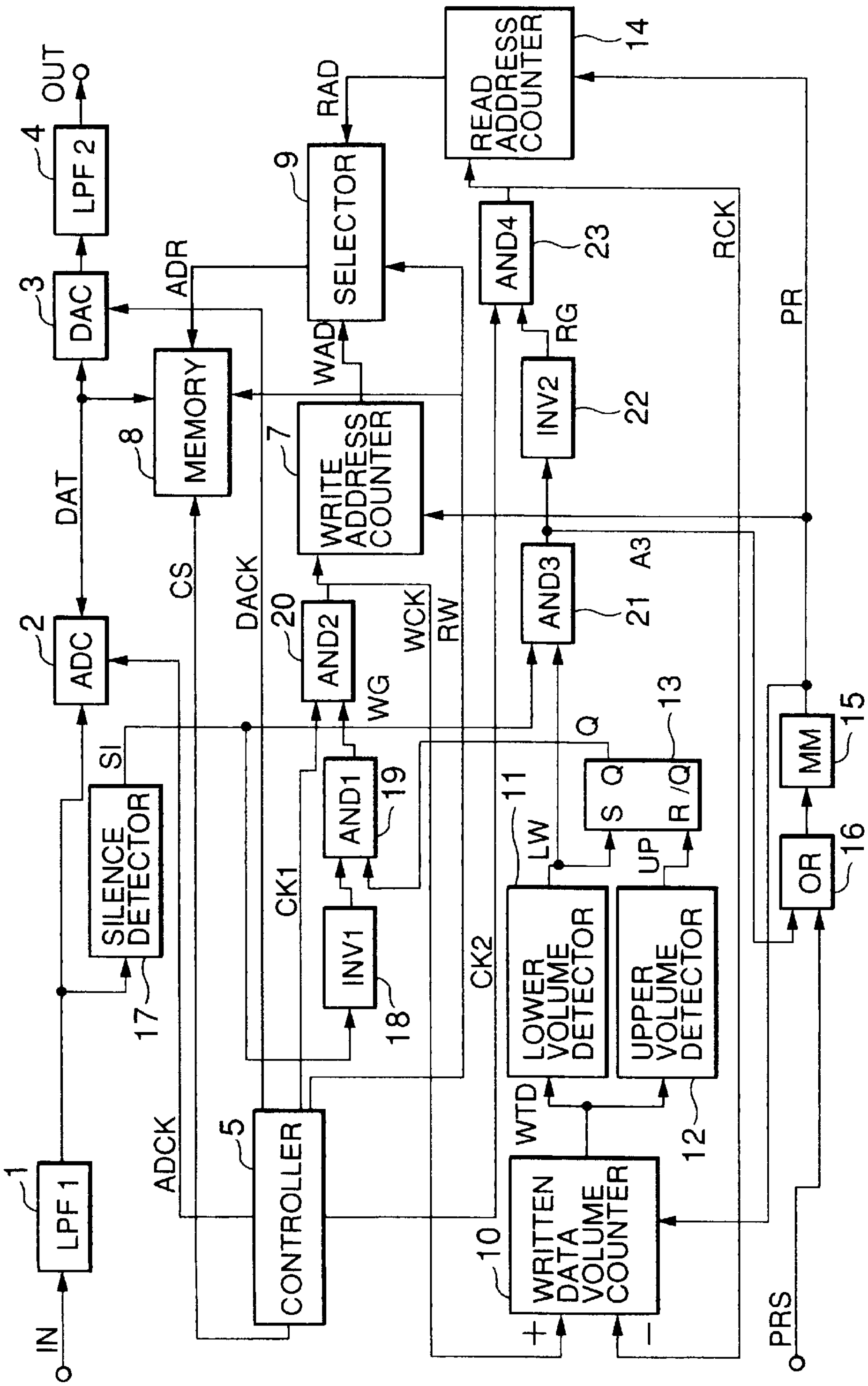
FIG. 6 is the block diagram showing the third embodiment of the audio signal processor according to the present invention.

FIG. 6 is the block diagram showing the third embodiment of the audio signal processor according to the invention, which is further provided with silence removal feature.

In FIG. 6, the difference from the second embodiment shown in FIG. 3 is the additional installation of a silence detector (DET) 17 and a first and a second logic circuit. The first logic circuit is constituted by an inverter (INV1) 18 and an AND gate (AND1) 19 to generate a signal WG on the basis of an output signal S1 of the silent detector 17 and the output Q of the RS Flip-flop 13. The second logic circuit is constituted by an AND gate (AND3) 21 and an inverter (INV2) 22 to generate a signal RG on the basis of the output signal SI and the output signal LW of the lower volume detector 11.

FIG. 7 is a block diagram showing a configuration of the silence detector 17 shown in FIG. 6. Further, FIGS. 8A to 8E are illustrations showing signal waveforms at respective stages in the silence detector 17 shown in FIG. 7.

An input audio signal "a" shown in FIG. 7 from the low-pass filter 1 of FIG. 3 is changed to a signal "b" via half-wave rectifier (RCT) 24. The signal "b" is then changed to a signal "c" via low-pass filter (LPF) with a very large time constant. The signal "c" functions as a reference level for level detection.

When a detected signal level is high in average, the voltage of the signal "c" becomes HIGH, and the reference level also becomes high. On the contrary, when a detected signal level is low in average, the voltage of the signal "c" becomes LOW, and the reference level also becomes low. The signals "b" and "c" are compared with each other to generate a signal "d" by a comparator (CMP) 26. Next, a retriggerable monomultiplier (MM) 27 generates a pulse signal "e" in response to the signal "d" as a trigger signal. Further, the signal "e" is inverted by an inverter (INV) 28 to obtain a silent-state signal SI.

Figure 9:
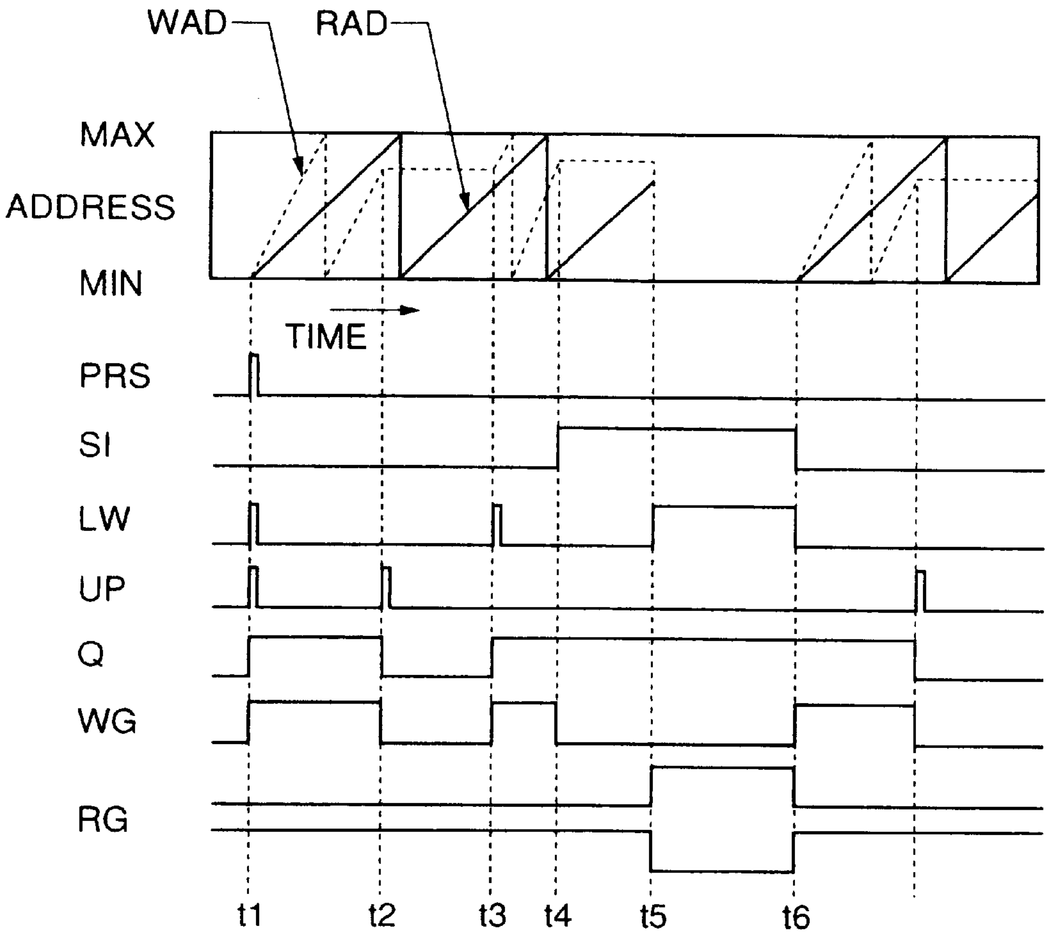
FIG. 9 is an illustration showing the address transition process of the memory and timing charts for the third embodiment.

FIG. 9 is an illustration showing the address transition process of the memory address and its timing chart in the case of double-speed processing (M=2) according to the third embodiment shown in FIG. 6.

The start pulse PRS initiates a new operation, which first causes the pulse PRS to be changed to the preset pulse PR via OR gate 16 and monomultiplier 15. The preset pulse PR is supplied to the written data volume counter 10, and the write and the read address counters 7 and 14. In this embodiment, the minimum value "0" is loaded to each counter as a preset value, however, the counters 7 and 14 may be loaded with any same value.

When presetting, the unread data volume WTD becomes zero and the output signal LW of the lower volume detector 11 becomes HIGH, and the RS flip-flop 13 is set at time t1. Then, the output Q of the flip-flop 13 becomes HIGH.

During the period of time (t1–t3), an input audio signal has a significant sound, so that the output signal SI of the silence detector 17 becomes LOW and the output of the inverter 18 becomes HIGH. Since the output of the AND gate 19 becomes HIGH, the output CK1 of the controller 5 changed to the clock WCK via AND gate 20. The clock WCK is input to the write address counter 7 and the written data volume counter 10. The output write address WAD of the write address counter 7 is updated at a speed twice of updating on the read address RAD, to perform pitch conversion.

When the updating on the write address WAD advances and hence the unread data volume WTD falls in the predetermined range (111111100000000–111111101111111), the output signal UP of the upper volume detector 12 becomes HIGH.

In normal operation, since the high-order 8 bits are checked, the signal UP becomes HIGH when the unread data volume WTD is 111111100000000. Even if clock input becomes unstable in the vicinity of the volume= 111111100000000, the above range check makes the operation stable.

Further, even in the worst case where the data volume becomes out of range, this results in the repetition of flip-flop (13) resetting, thus imposing no adverse affection to the output thereof.

When the RS flip-flop 13 is reset, its output Q becomes LOW at time t2 and the AND gate 20 does not output the signal WCK, thus stopping the counting operation of the write address counter 7. However, since the output signal LW of the lower volume detector 11 is LOW, the output signal RCK of the AND gate 23 is input to the read adders counter 14 continuously, so that the unread data volume WTD begins to decrease. Then, at time t3, when the high-order 8 bits of the volume WTD becomes 00000000, the signal LW changes to HIGH. The signal LW becomes HIGH on condition that the unread data volume WTD enters the range (000000000000000–000000001111111), however, in normal operation, a signal LW of high level is detected at the volume WTD "000000001111111". Even if clock becomes unstable in the vicinity of "000000001111111", the signal LW of high level is checked in the above range, so that the operation is stable. Further, even in the worst case where the data volume becomes out of range, this results in the repetition of flip-flop (13) resetting, thus imposing no adverse affection to the output thereof.

At time t4, the input signal becomes in a silent state, thus causing the output signal SI of the silence detector 17 to be HIGH. Since the output of the inverter 18 becomes LOW, the output signal WG of the AND gate 19 becomes LOW. Thus, the clock CK1 is not transferred to the write address counter 7 as the clock WCK, to stop the counting operation of write address counter 7.

At time t5, when the high-order 8 bits of the unread data volume WTD becomes 00000000, the output signal LW of the lower volume detector 11 is changed to HIGH. Since the silent state is being maintained, the signal S1 is HIGH, and also the signal LW is HIGH, the output signal A3 of the AND gate 21 becomes HIGH. This processing makes the output signal RG of the inverter 22 LOW, and the clock CK2 is blocked by an AND gate (AND 4) 23, thereby disabling the outputting of the clock RCK, thus resulting in suspension of the counting operation of the read address counter 14.

At the same time, the output signal A3 of the AND gate 21 triggers the preset signal PR via OR gate 16 and monostable multiplier 15 for the written data volume counter 10, and the write and the read address counters 7 and 14 to reinstate the initial condition. Here, the written data volume counter 10 is preset to 0.

Thereafter, even if an erroneous input of the clock RCK makes the unread data volume WTD equal to 111111111111111, the upper volume detector 12 does not detect this situation. This is owing to the fact that the maximum volume detected by the upper volume detector 12 is 11111110111111, thus enabling to cancel any erroneous signals coming in up to 128 pulses.

In more detail, even when the clock RCK is input to the written data volume counter 10 when its count is zero, a preinserted non-interference range prevents the remaining data volume from entering the upper limit range so soon, thereby preventing the output signal UP of the upper volume detector 12 from being HIGH, thus resulting in a stable operation.

At time t6, the input signal has a sound, the output signal SI of the silence detector 17 becomes LOW and the signals WG and RG become HIGH together, to restart the counting operation of the write and the read address counters 7 and 14.

Figure 10:
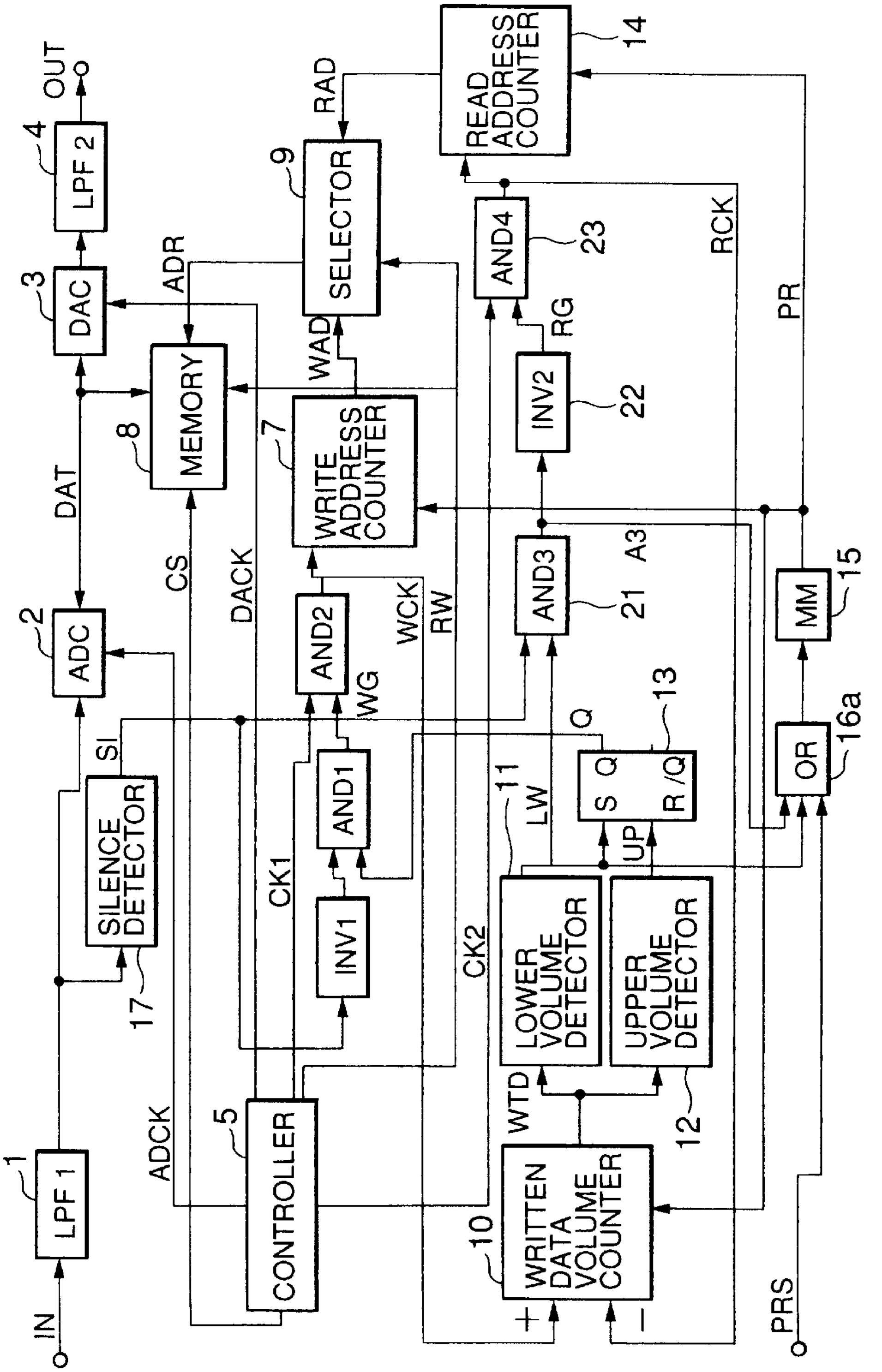
FIG. 10 is the block diagram showing the fourth embodiment of the audio signal processor according to the present invention.

FIG. 10 is the block diagram showing the fourth embodiment of the audio signal processor according to the invention. In FIG. 10, the difference from the third embodiment shown in FIG. 6 is that the output signal LW of the lower volume detector 11 is supplied to an OR gate 16*a* to generate the preset signal PR via monmultiplier 15 for presetting the written data volume counter 10, and the write and read address counters 7 and 14.

Figure 11:
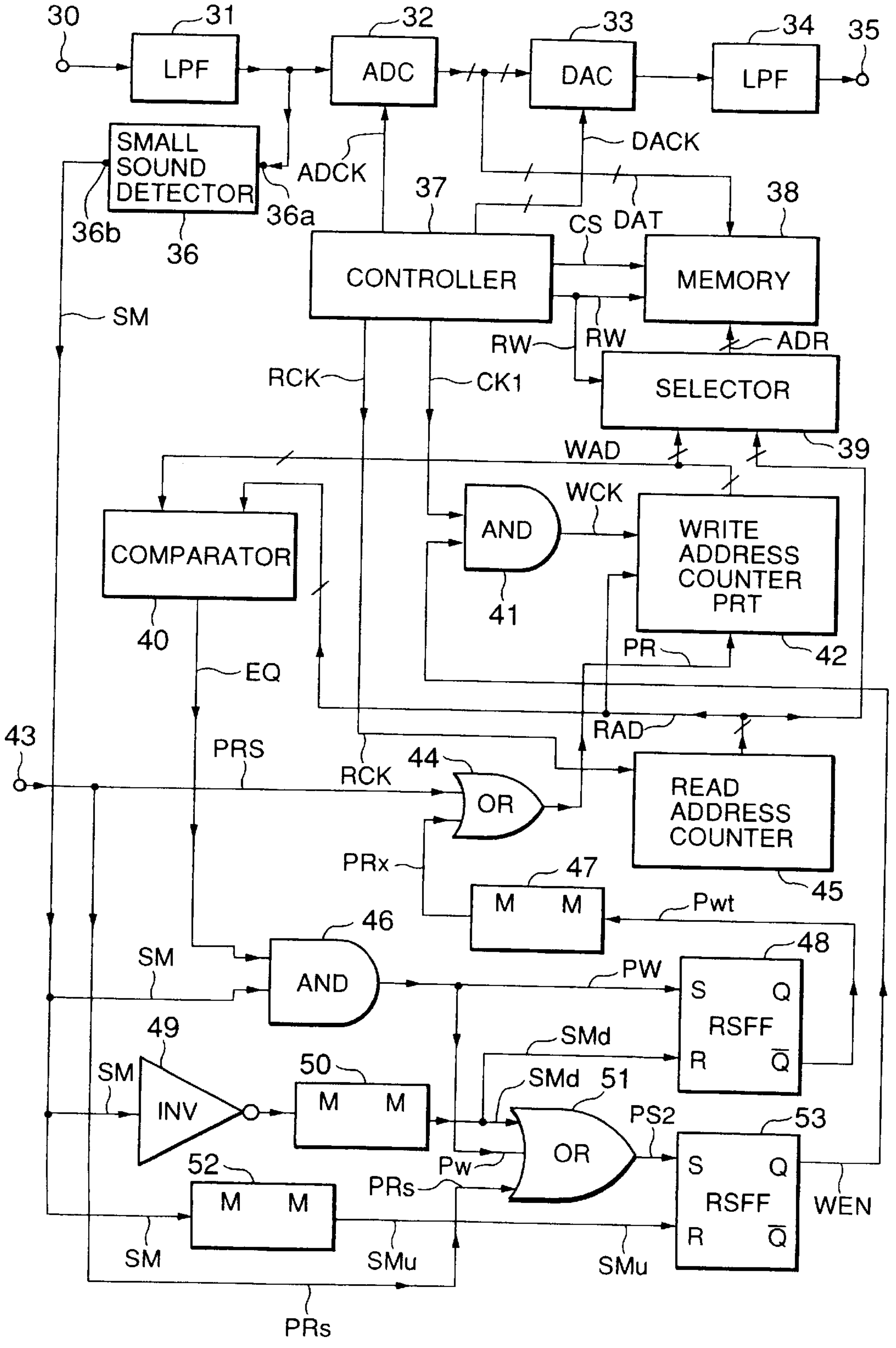
FIG. 11 is the block diagram showing the fifth embodiment of the audio signal processor according to the present invention.

FIG. 11 is the block diagram showing the fifth embodiment of the audio signal processor according to the invention.

In FIG. 11, an audio signal compresses in the time-axis direction is input from an input terminal 30 to an analog-to-digital (AD) converter (ADC) 32 via low-pass filter (LPF1) 31. The audio signal is sampled and quantized rapidly at a predetermined sampling period by the AD converter 32 to be converted into digital data. The digital data is then written into a memory 38.

Digital data read out from the memory 38 at a predetermined period longer than that of the sampling period of the AD converter 32 is converted into an analog signal by a digital-to-analog (DA) converter (DAC) 33. The analog signal is then output from an output terminal 35 via low-pass filter (LPF2) 34.

A controller 37 generates: a signal CK1 as the reference signal of a clock signal WCK to be input to a memory write address counter 42; a clock signal RCK to be input to a memory read address counter 45; a write/read selection signal RW; a memory control signal CS; a clock signal ADCK to the AD converter 32; a clock signal DACK to the DA converter 33; and other necessary signals.

The memory write address counter 42 is provided with a preset function. The counter 42 loads a read address RAD as described in detail later, when a preset signal PR supplied thereto is changed to HIGH.

An address selector 39 selects a read address RAD when the read/write selection signal RW is HIGH, to supply the selected address RAD to the memory 38 as an address signal ADR. On the other hand, the selector 39 selects a write address WAD when the selection signal RW is LOW, to supply the selected address WAD to the memory 38 as the address signal ADR.

A small sound detector 36 outputs a small sound-state signal SM of high level (indicating small sound state) when the input signal is lower than a predefined level.

FIG. 12 is a block diagram showing a configuration of the small sound detector 36, and FIGS. 13A to 13E are illustrations showing wave forms of signals in the detector 36.

In FIG. 12, an audio signal Sa shown in FIG. 13A supplied to an input terminal 36*a* is rectified by a rectifier 36*c* into a signal Sb shown in FIG. 13B. The signal Sb is supplied to a comparator (CMP) 36*e*. A threshold voltage Vc generated by a reference voltage generator (REF) 36*d* is also supplied to the comparator 36*e*.

Then, the comparator 36*e* compares the signal Sb with the threshold voltage Vc to output a pulse train Pd shown in FIG. 13C. The pulse train Pd is supplied to a retriggerable monostable multivibrator 36*f* as a trigger signal. The multivibrator 36*f* is retriggered when the time interval of successively supplied trigger signals is shorter than a predetermined period of time. Then, the multivibrator 36*f* generates a pulse Pe, which is LOW when the signal level of an audio signal (such as shown in FIG. 13B) is lower than a predetermined level while HIGH when the audio signal level is higher than the predetermined level. The generated pulse Pe is supplied to an inverter (INV) 36*g*. Then, the inverter 36*g* sends to an output terminal 36*b* such a small sound-state signal SM as shown in FIG. 13E, which is HIGH (indicating small sound state) when the audio signal level is lower than the predetermined level while LOW (indicating large sound state) when the audio signal level is higher than the predetermined level.

In FIG. 11, the reference signal CK1 for the memory write address counter 42 is changed to the clock signal WCK via AND gate 41. The clock signal WCK is input to the write address counter 42 for further advancement. On the other hand, the memory read address counter 45 is advancing the addresses while continuously making a cyclical addition from the top to the last addresses in the memory 38.

Figures 14A, 14B, 14C, 14D, 14E, 14F, 14G, 14H, 14I, 14J, 14K:
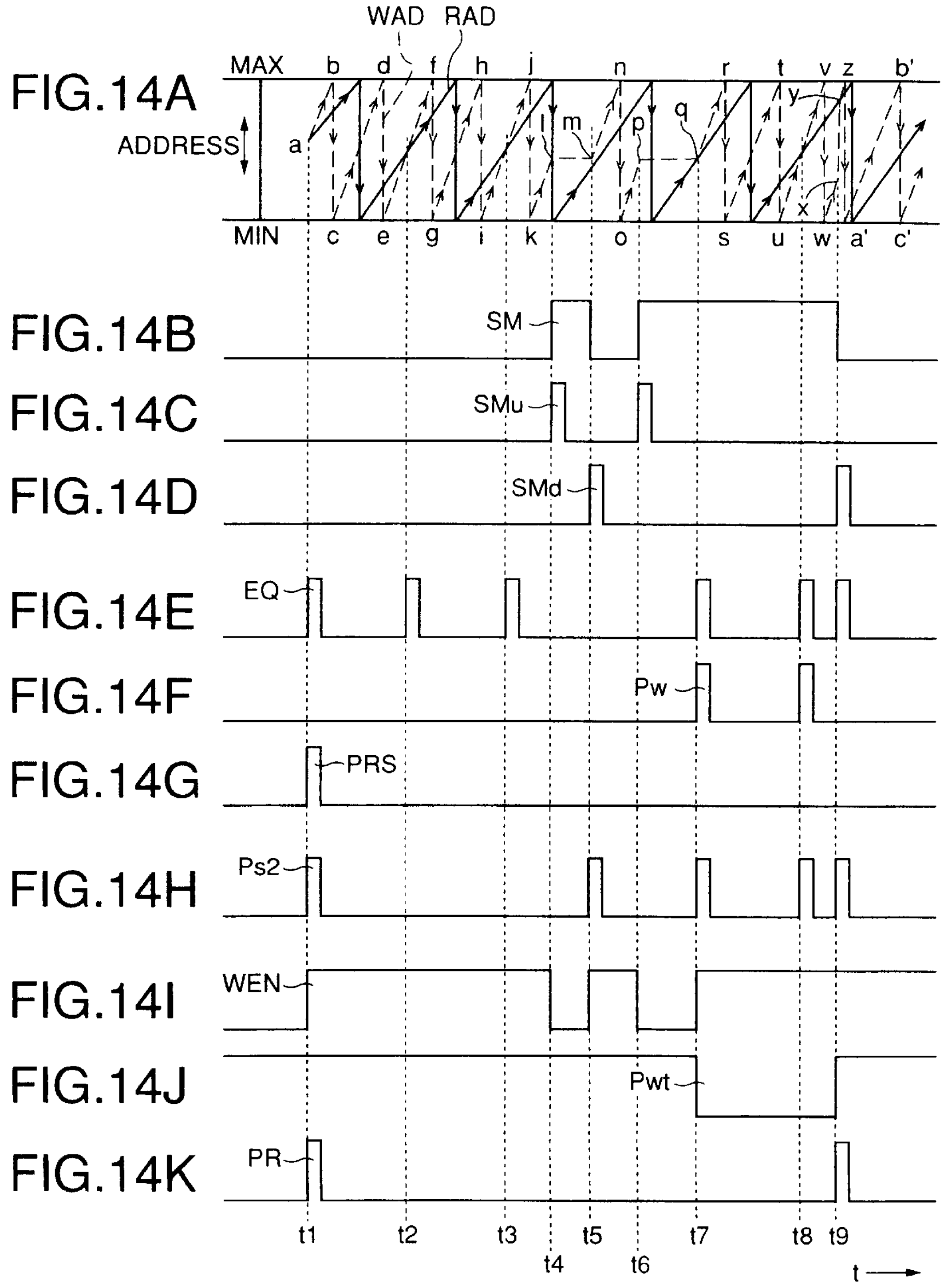
FIGS. 14A to 14K are timing charts explaining change in memory address and output signals of respective circuits of the audio signal processor shown in FIG. 11.

As exemplified by a broken line in FIG. 14A, the write address WAD of the memory write address counter 42 changes in various manners, while stopping or restarting the address advancement depending on the change in audio signal level.

Further, as exemplified by a solid line in FIG. 14A, the read addresses RAD of the memory read address counter 45 show such a change as follows; After the address RAD once changes from the top to the last address in the memory 38, this change is continuously repeated.

Figure 17:
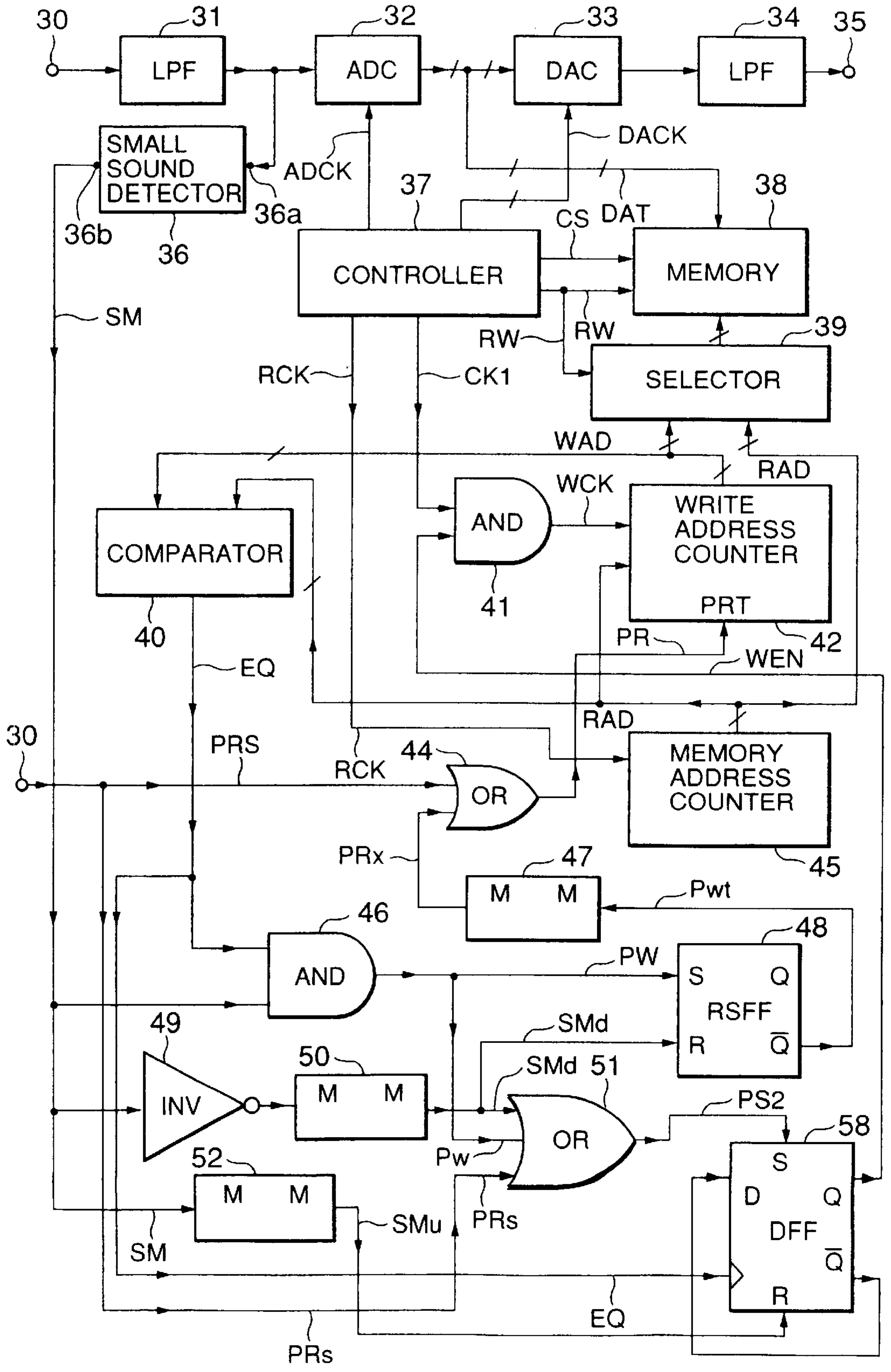
FIG. 17 is the block diagram showing the seventh embodiment of the audio signal processor according to the present invention.

Here, FIGS. 14A to 14K are timing charts for exemplifying change in memory address (FIG. 14A) and change in output signals (FIGS. 14B to 14K) of respective circuits of the audio signal processor shown in FIG. 17. The timing charts are observed when the audio signal processor is making a signal processing of an audio signal reproduced from a storage medium at a speed twice the recording speed.

There are two timing patterns in FIGS. 14A to 14K: One is time periods which have a significant or large sound, shown from time t1 to t4, from time t5 to t6 and from time t9 and on, in which the small sound-state signal SM shown in FIG. 14B output from the small sound detector 36 of FIG. 11 is LOW; the other is time periods which have a small sound, shown from time t4 to t5 and from time t6 to t9, in which the signal SM is HIGH. These two timing patterns are also applied to FIGS. 16A to 16N and 18A to 18K describe later.

At time t1, when an operation start pulse PRS shown in FIG. 14G comes in an input terminal 43 of the audio signal processor of FIG. 11, the processor starts both the address write and the address read operations at time t1. When the start pulse PRS is input to the preset terminal PRT of the memory write address counter 45 via OR gate 44 as a preset signal PR, the counter 45 loads a read address RAD, to make a write address WAD become identical to the read address RAD.

Further, the operation start pulse PRS is input to an OR gate 51, to be further supplied to the set terminal S of a set/reset flip-flop (RSFF) 53 as a set signal Ps2 shown in FIG. 14H. This process activates the flip-flop 53 to output a write enable signal WEN from the output terminal Q at time t1, and to supply the signal WEN to the AND gate 41. Then, the AND gate 41 supplies the reference signal CK1 supplied by the controller 37 to the memory write address counter 42 as the clock signal WCK.

In response to the clock signal WCK, the memory write address counter 42 starts counting operation at time t1. In the case shown in FIG. 14A, the write and the read addresses WAD and RAD at time t1 are indicated at a point “a”. The write address WAD output from the memory write address counter 42 changes on the straight broken line connecting points “a”, “b”, “c”, . . . , “j”, “k” and “l”. On the other hand, as described previously, the memory read address counter 45 is at all times outputting read address RAD which cyclically changes in between the head and the last addresses of the memory 38. The changing state of the read address RAD is shown by the solid line in FIG. 14A.

The equalization of the write and the read addresses WAD and RAD at time t1 as described above triggers the comparator 40 to output an equalization pulse EQ of high level shown in FIG. 14E at time t1. However, since at time t1 when the coming audio signal has a significant sound, the signal SM of small sound state shown in FIG. 14B is LOW, the AND gate 46 is closed. Therefore, the equalization pulse EQ output from the comparator 40 at time t1 is disabled, thus imposing no adverse effect to circuit operation (never setting the set/reset flip-flop 48). In the same manner, the equalization pulse EQ output from the comparator 40 at time t2 and t3 where the small sound state signal SM remains LOW in FIG. 14B is also disabled, thus imposing no adverse effect to circuit operation.

At time t4, the large sound period changes into a small sound period, so that the small sound state signal SM changes from LOW to HIGH as shown in FIG. 14B. Then, at time t4, a monostable multivibrator 52 is triggered to generate a pulse SMu shown in FIG. 14C, which is given to the reset terminal R of the set/reset flip-flop 53. Therefore, the flip-flop 53 is reset at time t4. This reset causes the write enable signal WEN shown in FIG. 14I output from the terminal Q of the set/reset flip-flop 53 to change from HIGH to LOW at time t4, thereby closing the AND gate 41. This disables so far continued supply of the write clock signal WCK to the memory write address counter 42 from the AND gate 41, so that, at time t4, the counting operation of the counter 42 is brought into a stop.

At time t5, the small sound state signal SM shown in FIG. 14B changes from HIGH (small sound or silent) to LOW (large sound or significant sound.) However, when the signal SM has changed so, a signal output from an inverter 49 changes from LOW to HIGH, so that, at time t5, a monostable multivibrator 50 is triggered to generate a pulse SMd as shown in FIG. 14D. The pulse SMd is supplied to the set terminal S of the set/reset flip-flop 53 as a set signal Ps2 via OR gate 51, and also to the reset terminal R of the set/reset flip-flop 48.

In response to the pulse SMd, the set/reset flip-flop 53 outputs the write enable signal WEN from the terminal Q at time t5, to supply it to the AND gate 41. In response to the signal WEN, the AND gate 41 supplies the clock signal WCK to the memory write address counter 42 to start the counting operation from time t5.

The write address WAD at time t5 is located at a point "m" in FIG. 14A corresponding to the point "1" at which the write address WAD was located at time t4. The counting operation of the memory write address counter 42 causes the output write address WAD to change along a straight line shown by broken line connecting points "m", "n", "o" and "p".

Even the pulse SMd is supplied, the set/reset flip-flop 48, which is not set at time t5, does not change its operation, thus maintaining the terminal /Q at HIGH even at time t5.

Next, at time t6, the small sound state signal SM output from the small sound detector 36 changes from LOW (large sound or significant sound) to HIGH (small sound or silent) to trigger the monostable multivibrator 52, the multivibrator 52 generates the pulse SMu shown in FIG. 14C at time t6, to supply it to the reset terminal R of the set/reset flip-flop 53.

Given the pulse SMu, the flip-flop 53 is reset at time t6, thus changing the write enable signal WEN output from the terminal Q from HIGH to LOW, resulting in a closure of the AND gate 41. Therefore, the supply of the clock signal WCK to the memory write address counter 42 is blocked, to bring its counting operation to a halt at time t6.

However, the addressing of the memory read address counter 45 is advancing further even after the halt of the counting operation of the memory write address counter 42 at time t6. Therefore, at time t7, the write and the read addresses WAD and RAD become identical to each other at a point "q" in FIG. 14A. This triggers an equalization pulse EQ of high level from the comparator 40, to supply it to the AND gate 46. As described previously, a period from time t6 to t9 belongs to a small sound period. And at a time t7 in the small sound period, the small sound state signal SM shown in FIG. 14B maintains HIGH, so that a pulse Pw shown in FIG. 14F is output from the AND gate 46. The pulse Pw is supplied to the set terminal S of the set/reset flip-flop 53 as a set signal Ps2 shown in FIG. 14H via OR gate 51, and at the same time to the set terminal S of the set/reset flip-flop 48.

Given the set signal Ps2, the set/reset flip-flop 53, although it is a time in the small sound period starting from time t6, triggers the write enable signal WEN from its terminal Q at time t7, to supply it to the AND gate 41. The AND gate 41 supplies the clock signal WCK to the memory write address counter 42, thus again bringing the counter 42 into counting operation at time t7.

The write address WAD issued at time t7 is located at a point "q" corresponding to the point "p" at which the write address WAD was located at time t6.

And, by the counting operation of the memory write address counter 42, the write addresses WAD output from the counter 42 change along a broken straight line connecting the points "q", "r", "s", "t", "u" and so on. At time t8, the write address WAD becomes identical to the read address RAD and the comparator 40 outputs an equalization pulse EQ of high level that is supplied to the AND gate 46. Since time t8 is located in a small sound period starting from time t6 to t9, the small sound state signal SM (shown in FIG. 14B output from the small sound detector 36 at time t8 is HIGH. And, the AND gate 46 outputs a pulse Pw that is supplied to the set terminal S of the set/reset flip-flop 53 as a set signal Ps2 via OR gate 51 and also to the set terminal S of the set/reset flip-flop 48.

However, as described above, since the flip-flops 48 and 53 have been already set at time t7, so that, even if given a new set signal, they do not change their operation conditions. Therefore, the write address WAD to be output from the memory write address counter 42 at time t7 and thereafter will change along the broken straight line connecting points "q", "r", "s", "t", "u", "v", "w" and "x" as shown in FIG. 14A.

Then, when the small sound state signal SM output from the small sound detector 36 is changed from HIGH (small sound or silent) to LOW (large sound or significant sound), a signal output from the inverter 49 is changed from LOW to HIGH, so that the monostable multivibrator 50 is triggered to generate a pulse SMd shown in FIG. 14D at time t9. The pulse SMd is supplied to the set terminal S of the set/reset flip-flop 53 as the set signal Ps2 via OR gate 51 and also to the reset terminal R of the set/reset flip-flop 48.

At time t9, even if receiving the set signal Ps2, the set/reset flip-flop 53, which has been set previously, will maintain the preceding operation. Thus, even at time t9 and thereafter, the flip-flop 53 continues to supply a write enable signal WEN of high level to the AND gate 41. And, the AND circuit 26 continues to supply the clock signal WCK to the memory write address counter 42.

Further, in response to the pulse SMd output from the monostable multivibrator 50 at time t9, the set/reset flip-flop 48 is reset at time t9, thereby causing the pulse Pwt shown in FIG. 14J output from its terminal /Q to be changed from LOW to HIGH at time t9. The pulse Pwt then triggers the monostable multivibrator 47 so as to output a pulse PRx at time t9. The pulse PRx is supplied to the preset terminal PRT of the memory write address counter 42 as a preset signal PR via OR gate 44. Then, the write address WAD of the memory write address counter 42 at time t9 is forcibly changed so as to be identical to the read address RAD at time t9 (shown by a transition of points "x" to "y" in FIG. 14A.)

In the audio signal processor according to the present invention, in such a long time duration of the small sound or silent period as shown from time t6 to t9, even in the time duration from time t7 to t9, a small audio signal in the small sound period is written in the memory 38. Thus, even in such a long duration of small sound period, reproduced sound is prevented from being interrupted.

However, if there is a deviation between the reproduced image and sound at time t9 when the small sound period shifts to a large sound period, the deviation may often make viewers feel a sense of incompatibility.

Therefore, the audio signal processor according to the invention makes such an operational control as follows:

When a small sound period during which a small audio signal is written into a memory is changed to a large sound period, the write address WAD is forcibly changed so as to be exactly or closely identical to the read address RAD at that time point.

In more detail, it is assumed that the counting operation of the memory write address counter 42 of FIG. 11 starting at time t6 of FIG. 14A in the small sound period changes the write addresses WAD along a broken line connecting the points "q", "r", "s", "t", "u", "v", "w" and "x". And, if, the small sound period is changed into a large sound period at time t9, a write address WAD located at the point "x" at time t9 is forcibly changed into the read address RAD located at the point "y" at time t9. Thus, at time point t9 and thereafter, the write addresses WAD change along the broken line connecting the points "y", "z", "a'", "b" and "c'". Further, at the time point when a small level sound is suddenly changed into a large level sound, a reproduced VTR image is brought into accord with a reproduced sound, thereby minimizing the sense of incompatibility of viewers.

Figure 15:
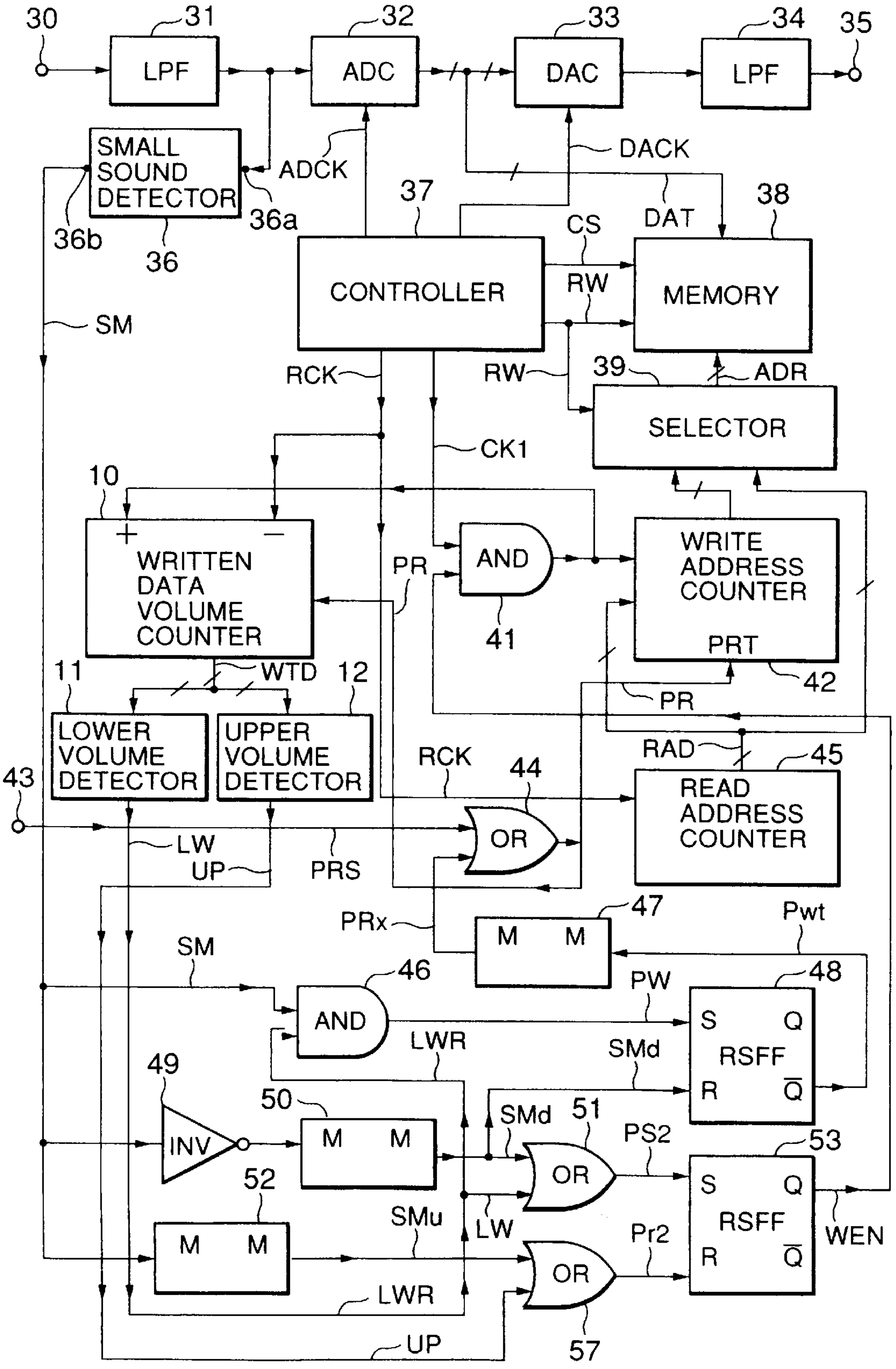
FIG. 15 is the block diagram showing the sixth embodiment of the audio signal processor according to the present invention.

FIG. 15 is the block diagram showing the sixth embodiment of the audio signal processor according to the invention.

The functions of the low-pass filters 31 and 34, AD converter 32, DA converter 33, small sound detector 36, controller 37, memory 38, address selector 39, and memory write and read address counters 42 and 54 in FIG. 15 are basically the same as those of the fifth embodiment shown in FIG. 11.

Further, the functions of the written (unread) data counter 10, and the lower and the upper volume detectors 11 and 12 are basically the same as those of the first embodiment shown in FIG. 1.

Figures 16A, 16B, 16C, 16D, 16E, 16F, 16G, 16H, 16I, 16J, 16K, 16L, 16M, 16N:
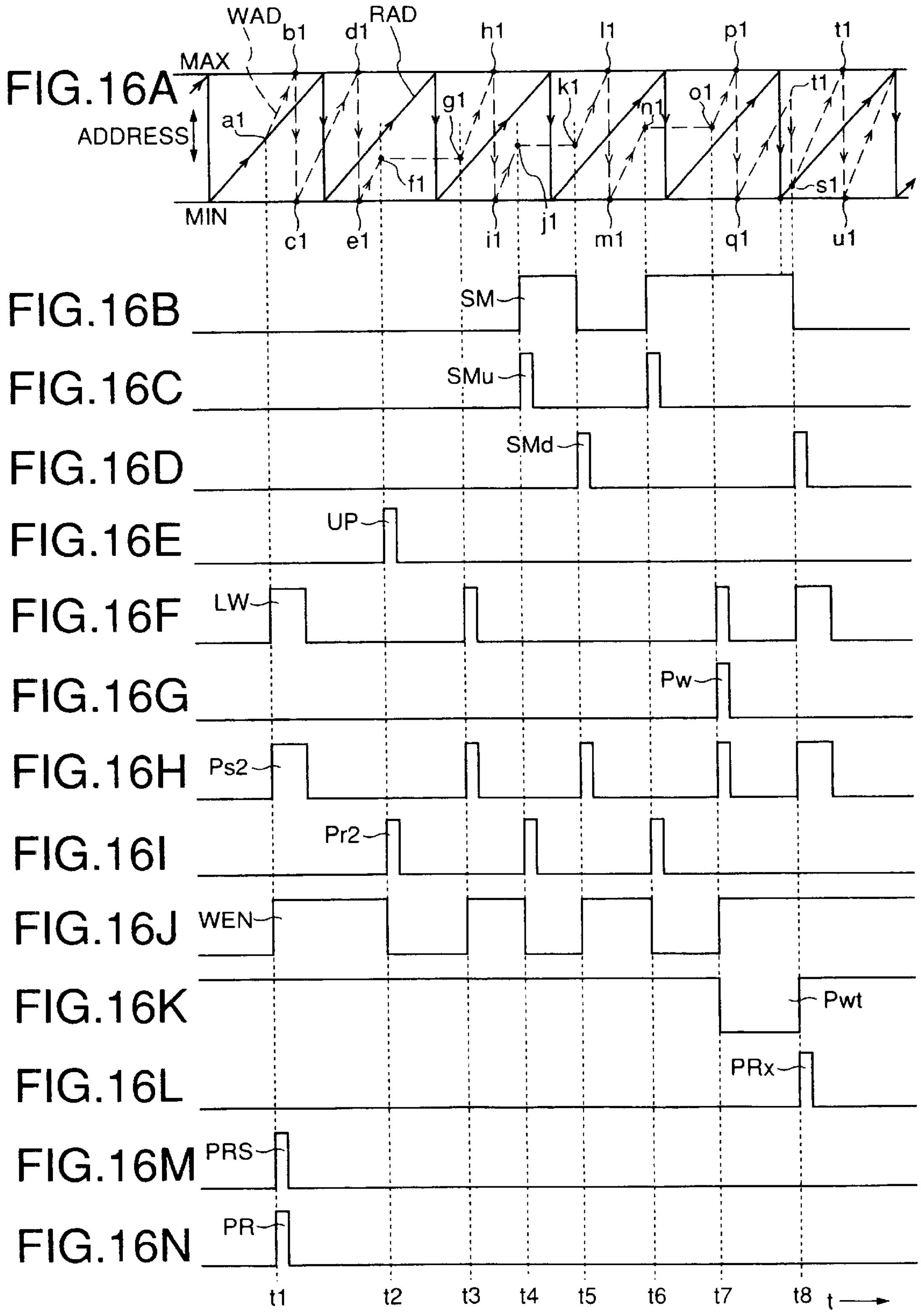
FIGS. 16A to 16N are timing charts explaining change in memory address and output signals of respective circuits of the audio signal processor shown in FIG. 15.

FIGS. 16A to 16N are timing charts for exemplifying change in memory address (FIG. 16A) and change in output signals (FIGS. 16B to 16N) of respective circuits of the audio signal processors of FIG. 15. The timing charts are observed when the audio signal processor is making a signal processing of an audio signal reproduced from a storage medium at a speed twice the recording speed.

In accordance with the timing charts, the audio signal processor starts write and read operations at time t1 when an operation start pulse PRS shown in FIG. 16M comes in the input terminal 43 of the processor shown in FIG. 15. When the pulse PRS is input to the preset terminal PRT of the memory write address counter 42 via OR gate 44, the counter 42 loads a read address RAD, to make a write address WAD becoming identical to the read address RAD.

The agreement of the write and read addresses WAD and RAD activates the lower volume detector 11 to output a signal LW shown in FIG. 16F at time t1. The signal LW is then supplied to the OR gate 51 and the AND gate 46.

At time t1 with a significant sound, a small sound-state signal SM shown in FIG. 16B is LOW, so that the AND gate 46 will not output the signal LW. On the other hand, the signal LW input to the OR gate 51 is supplied to the set terminal S of the set/reset flip-flop (RSFF) 48 as a set signal Ps2 as shown in FIG. 16H. In response to the signal Ps2, the flip-flop 53 outputs a write enable signal WEN from the output terminal Q at time t1, and supplies the signal WEN to the AND gate 41.

Then, the reference signal CK1 for the memory address counter 42 supplied to the AND gate 41 from the controller 37 is changed to the clock signal WCK that is supplied to the counter 42. The memory write address counter 42 then starts counting operation at time t1 in response to the clock signal WCK.

In the case shown in FIG. 16A, the write and the read addresses WAD and RAD at time t1 are located at a point "a1". The write addresses WAD output from the memory write address counter 42 by the counting operation change on the straight broken line connecting points "a1", "b1", "c1", "d1", "gel" and "f1". On the other hand, as described with reference to FIG. 11, the memory read address counter 45 is at all times outputting the read addresses RAD which cyclically change between the head and the last addresses of the memory 38. The change in read address RAD is shown by the solid line in FIG. 16A.

At time t2, when the upper volume detector 12 detects that the unread data volume falls in a predetermined upper limit range, the detector 12 outputs an UP signal of high level. The signal UP is supplied to the reset terminal R of the set/reset flip-flop 53 as a reset signal Pr2 shown in FIG. 16I via OR gate 57, thereby causing the flip-flop 53 to be reset at time t2.

By the reset of the flip-flop 53, a write enable signal WEN output from the terminal Q changes to LOW at time t2 to close the AND gate 41. Thus, the clock signal WCK is not supplied to the write address counter 42, bringing the counting operation of the counter 42 to a stop at time t2. And, at time t2 and thereafter, since the reading of the digital data from the memory 38 is continued, the unread data volume is gradually decreased at time t2 and on.

When the lower volume detector 29 detects that the unread data volume falls in a predetermined lower limit range at time t3, the detector 29 outputs a signal LW of high level as shown in FIG. 16F. The signal LW is supplied to the AND gate 46 and the OR gate 51.

The signal LW of high level supplied to the OR gate 51 is given to the set terminal S of the set/reset flip-flop 53 as a set signal Ps2 shown in FIG. 16H. In response to the signal Ps2, at time t3, a write enable signal WEN of high level is output from the output terminal Q of the flip-flop 53 and supplied to the AND gate 41.

In response to the signal WEN, at time t3, the AND gate 41 supplies the clock signal WCK to the memory write address counter 42, thereby starting its counting operation from time t3.

In the example shown in FIG. 16A, the write address WAD at time t3 is located at a point "g1" identical to the write address WAD located at a point "f1" at time t2. Further, the write address WAD output from the memory write address counter 42 by its counting operation changes along the broken straight line connecting points "g1", "h1", "i1" and "j1".

When the small sound state signal SM shown in FIG. 16B output from the small sound detector 36 changes from LOW (indicating significant sound or large sound) into HIGH (small sound or silent) at time t4, the monostable multivibrator 52 is triggered to generate a pulse SMu as shown in FIG. 16C.

The pulse SMu is supplied via OR gate 57 to the reset terminal R of the set/reset flip-flop 53 as the reset signal Pr2 as shown in FIG. 16I. The flip-flop 53 is thus reset at time t4 to cause the write enable signal WEN shown in FIG. 16J output from its output terminal Q to change from HIGH to LOW. Therefore, the AND gate 41 stops to supply the write clock signal WCK to the memory write address counter 42, thus the counting operation being brought to a stop.

When the small sound state signal SM shown in FIG. 16B changes from HIGH (small sound or silent) to LOW (large sound or significant sound) at time t5, a signal output from the inverter 49 changes from LOW to HIGH. The monostable multivibrator 50 is thus triggered to generate a pulse SMd as shown in FIG. 16D.

The pulse SMd is supplied to the set terminal S of the set/reset flip-flop 53 as the set signal Ps2 via OR gate 51. In response to the signal Ps2, the flip-flop 53 outputs the write enable signal WEN from its terminal Q at time t5, to supply it to the AND gate 41. Therefore, the AND gate 41 supplies the clock signal WCK to the memory write address counter 42, thus starting the counting operation from time t5.

The pulse SMd output from the monostable multivibrator 50 at time t5 is also supplied to the set terminal R of the set/reset flip-flop 48. But, since the flip-flop 48 has not yet set at time t5, the pulse SMd does not change the operation mode of the flip-flop 48, thus maintaining the high level of the terminal /Q as it is even at time t5.

And, the write address WAD output from the memory write address counter 42 which has restarted the counting operation at time t5 is changing along a broken straight line connecting points "k1", "l1", "m1" and "n1".

Next, at time t6, when the small sound state signal SM shown in FIG. 16B changes from LOW (large sound or significant sound) to HIGH (small sound or silent), the monostable multivibrator 52 is triggered to generate the pulse SMu shown in FIG. 16C at time t6. The pulse SMu is then supplied to the reset terminal R of the set/reset flip-flop 53 as the reset signal Pr2 as shown in FIG. 16I via OR circuit 57.

In response to the pulse Pr2, the flip-flop 53 is reset at time t6 to change the write enable signal WEN output from its output terminal Q from HIGH to LOW. The AND gate 41 thus stops to supply the clock signal WCK to the memory write address counter 42 to bring the counting operation of the counter 42 to a halt at time t6. Here, the small sound period starting at time t6 continues over a long period extending to time t8 when the small sound state signal SM being output from the small sound detector 36 will change from HIGH (small sound or silent) to LOW (large sound or significant sound.)

At time t6 and thereafter, the memory write address counter 42 has stopped its counting operation. However, reading of digital data from the memory 38 has been continued. Therefore, the unread data volume in the memory 38 is gradually decreased from time t6 and on. The decreasing data volume may fall in a predetermined lower limit range at time t7 before time t8 when the small sound period which has started at time 6 changes into a large sound period.

In the case where the data volume falls in the predetermined lower limit range, the lower volume detector 11 which has been given the signal WTD from the written data volume counter 10 detects the fall at time t7 to output the signal LW of high level shown in FIG. 16F to supply it to the AND and OR gates 46 and 51.

In response to the signal LW, the OR gate 51 outputs a set signal Ps2 shown in FIG. 16H to supply it to the set terminal S of the set/reset flip-flop 53. Thus, the flip-flop 53 outputs, from time t7, a write enable signal WEN of high level from its output terminal Q. The signal WEN is then supplied to the AND gate 41.

In response to the signal WEN, the AND gate 41 supplies the clock signal WCK to the memory write address counter 42 at time t7. This causes the counter 42 to start the counting operation at time t7. And, at time t7, the small sound-state signal SM shown in FIG. 16B output from the small sound detector 36 is HIGH (indicating small sound or silent.) The AND gate 46 thus supplies the signal LW of high level shown in FIG. 16F output from the lower volume detector 11 at time t7 to the set terminal S of the set/reset flip-flop 48 as a signal Pw as shown in FIG. 16G to set the flip-flop 48.

The write addresses WAD output from the memory write address counter 42 which has started its counting operation as described above change along a broken straight line connecting points "o1", "p1", "q1" and "r1". Since, the period from time t7 to t8 exists in a small sound period from time t6 to t8, an audio signal to be written in the memory 38 during the period from time t7 to t8 is a small signal.

In other words, according to the sixth embodiment, in the case of a small sound period where audio signals of lower level than a predetermined signal level exist for a long duration required for the change in read address RAD from the minimum to the maximum addresses of the memory 38, audio signals compressed in the time-axis direction of low level basically not required are written in to the memory 38 and read out therefrom by decompressing the audio signals in the time-axis direction, thereby preventing the reproduction sound from being interrupted even in such a long small sound period.

At time t8, when the small sound-state signal SM shown in FIG. 16B output from the small sound detector 36 changes from HIGH (small sound or silent) to LOW (large sound or significant sound), the output signal of the inverter 49 changes from LOW to HIGH. The monostable multivibrator 50 is thus triggered to generate a pulse SMd as shown in FIG. 16D at time t8.

The pulse SMd is then supplied to the set terminal S of the set/reset flip-flop 53 as a set signal Ps2 shown in FIG. 16H via OR gate 51. However, since the flip-flop 53 has already been set at time t7 as described previously, the set signal Ps2 output at time t8 does not change the operation mode of the flip-flop 53.

The pulse SMd is supplied further to the set terminal R of the set/reset flip-flop 48. Thus, the flip-flop 48 is set at time t8 to output a signal Pwt which is changed from LOW to HIGH at time t8 as shown in FIG. 16K from the output terminal /Q of the flip-flop 48. The monostable multivibrator 47 is triggered by the signal Pwt to output a signal PRx as shown in FIG. 16L. The signal PRx is supplied to the preset terminal PRT of the memory write address counter 42 as a preset signal PR as shown in FIG. 16N via OR gate 44. In response to the preset signal PR, the counter 42 loads the read address RAD at time t8 to make the write address WAD become identical to the loaded read address RAD, thus restarting the counting operation of write address WADs.

By the counting operation of the memory write address counter 42 which has started at time t6 in the small sound period, the write addresses WAD output from the counter 42 are changing along the broken straight line connecting points "o1", "p1", "q1" and "r1". On the other hand, the memory read address counter 45 is outputting read addresses RAD which always change cyclically from the head to the last addresses of the memory 38, as shown by the solid line in FIG. 16A.

According to the sixth embodiment, as described above, when an unread data volume in the memory 38 falls within a predetermined lower limit range at time t7 before time t8 when a small sound period starting at time t6 is changing to a large sound period, the audio signal of small level is written in the memory 38 even in the intermediate period from time t7 to t8 in the small sound period. Thus, sound can be prevented from being interrupted even in a case of long small sound period.

However, if there is a deviation between the reproduced image and sound at time t8 when the small sound period has shifted to the large sound period, the deviation often tends to make viewers feel a sense of incompatibility.

Further, it is assumed that the unread data volume is approaching close to the higher limit range by writing digital data in the small sound period, and the small sound period changes into the large sound period. In this case, the unread data volume in the memory 38 may enter the higher limit range with only a slight amount of audio data in the large sound period being written in the memory 38, thus leaving a significant volume of important audio signal data in the large sound period unwritten.

Therefore, the audio signal processor according to the invention performs a special operation such as: When the small sound period in which audio signals of small level have been written in the memory 38 changed into the large sound period, the write address WAD is forcibly changed so as to be completely or closely identical to the read address RAD at the time point.

In other words, by the counting operation of the memory write address counter 42 which started at time t6 in the small sound period, the write addresses WAD output from the counter 42 change on a broken line connecting points "o1", "p1", "q1" and "r1". In that time duration, it is assumed that the small sound period changes into the large sound period at time t8 as shown in FIG. 16B (the small sound-state signal SM changes from HIGH to LOW.) Then, the write address WAD located at the point "r1" at time t8 is forcibly rewritten to the read address RAD located at the point "s1" at time t8, thereby forcing the write addresses WAD to change along a broken line connecting points "r1", "s1", "t1" and "u1" from time t8 and on.

This enforced change can bring the reproduced image on VTR into accord with the reproduced sound in the case where the small level sound suddenly change into the large level sound, thus minimizing the sense of incompatibility.

Further, this change obtains a good audible signal with the maximum time length in which a train of audio signals is written in the memory 38.

FIG. 17 is the block diagram showing the seventh embodiment of the audio signal processor according to the invention.

The functions of the low-pass filters 31 and 34, AD converter 32, DA converter 33, small sound detector 36, controller 37, memory 38, address selector 39, and memory write and read address counters 42 and 45 in FIG. 17 are basically the same as those of the fifth embodiment shown in FIG. 11.

FIGS. 18A to 18K are timing charts for exemplifying change in memory address (FIG. 18A) and change in output signals (FIGS. 18B to 18K) of output signals of respective circuits of the audio signal processor shown in FIG. 17.

The timing charts are observed when the audio signal processor is making a signal processing of an audio signal, that has been compressed in the time-axis direction, reproduced from a storage medium at a speed twice the recording speed.

Figures 18A, 18B, 18C, 18D, 18E, 18F, 18G, 18H, 18I, 18J, 18K:
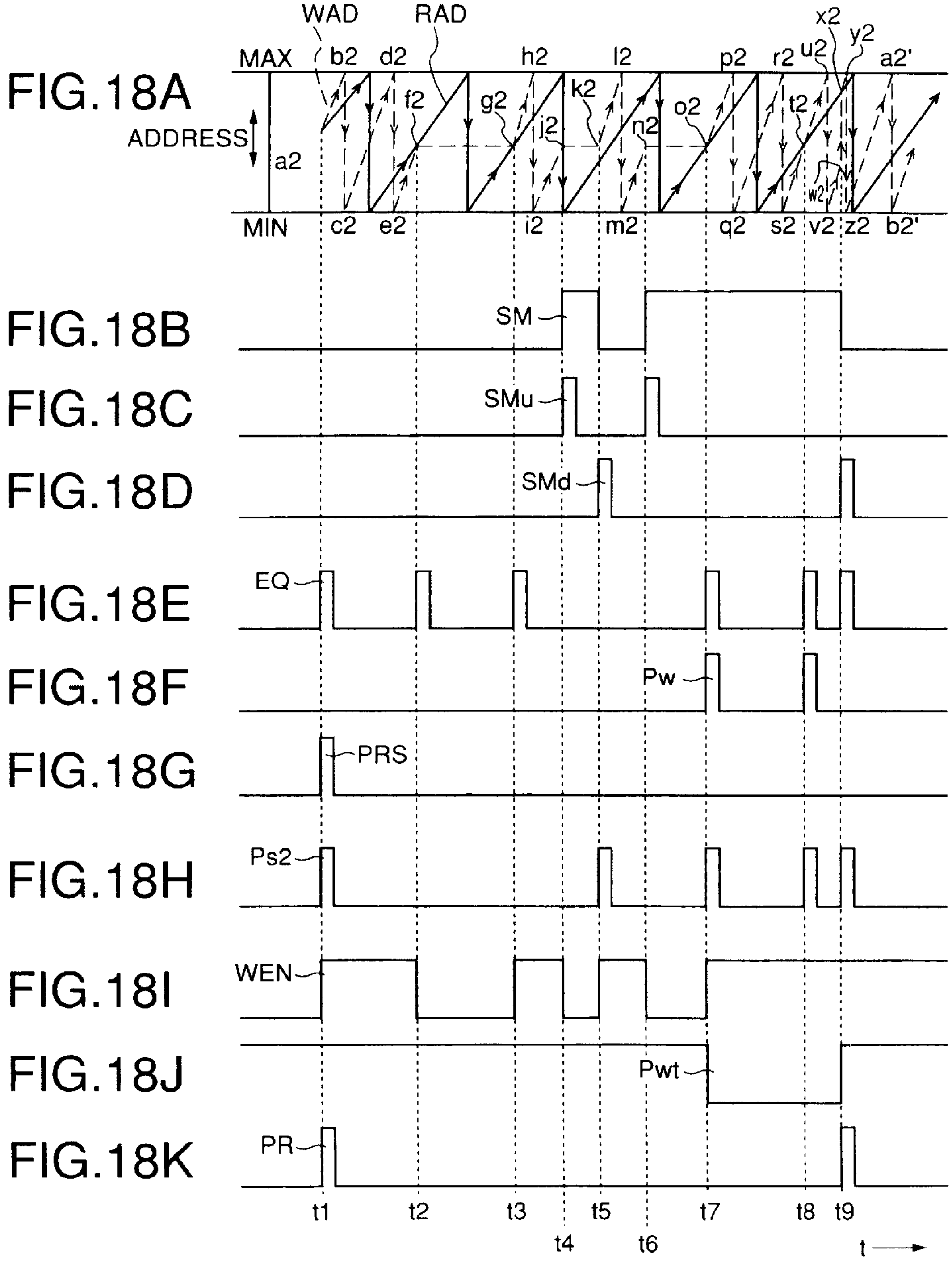
FIGS. 18A to 18K are timing charts explaining change in memory address and output signals of respective circuits of the audio signal processor shown in FIG. 17.

At time t1, in response to an operation start pulse PRS shown in FIG. 18G given at the terminal 43, the audio signal processor starts both the write and the read operations at time t1.

When the pulse PRS is input to the preset terminal PRT of the memory write address counter 42 via OR gate 44 as the preset signal PR, the counter 42 loads a read address RAD at time t1 to make a write address WAD become identical to the loaded read address RAD.

The operation start pulse PRS is further supplied to the OR gate 51. In response to the pulse PRS, the OR gate 51 supplies a set signal Ps2 of high level as shown in FIG. 18H to the set terminal of a D-type flip-flop 58.

In response to the signal Ps2, the flip-flop 58 is set at time t1 to output a write enable signal WEN of high level shown in FIG. 18I of high level from its output terminal Q. The signal WEN is supplied to the AND gate 41. Then, the AND gate 41 supplies the reference signal CK1 given by the controller 37 to the memory write address counter 42 as the clock signal WCK.

Then, the memory write address counter 42 starts the counting operation at time t1. In the example shown in FIG. 18A, the write and the read address WAD and RAD at time t1 are both located at a point "a2". By the counting operation of the counter 42, the write addresses WAD are changing along the broken line connecting points "a2", "b2", "c2", . . . and "f2" in FIG. 18A. On the other hand, the memory read address counter 45 outputs read addresses RAD as shown by the solid line at all times repeating a changing cycle from the head to the last addresses in the memory 38.

As described before with reference to FIG. 11, at time t1, when the write address RAD becomes identical to the read address RAD, the comparator 40 outputs an equalization pulse EQ as shown in FIG. 18E at time t1, to supply the signal EQ to the AND gate 46.

However, since time t1 belongs to the significant or large sound period from time t1 to t4, the small sound-state signal SM shown in FIG. 18B output from the small sound detector 36 at time t1 is LOW (indicating large or significant sound state).

Therefore, the AND gate 46 does not output the equalization signal EQ as the write set pulse PW. The set/reset flip-flop 48 thus is not set at time t1. This state is also applicable to equalization pulses EQ to be output from the comparator 40 at time t2 and t3 in the periods of the small sound-state signal SM of low level (indicating large sound or significant sound).

From time t1, the memory write address counter 42 is advancing the counting operation, and then when the write and read addresses WAD and RAD become identical to each other at time t2, the comparator 40 outputs the equalization signal EQ, which is given to the clock terminal of the D-type flip-flop 58 already set.

Therefore, at time t2, the flip-flop 58 reads low-level data supplied to its data terminal D from its terminal /Q, to output the data from the output terminal Q at time t2. The write enable signal WEN output from the terminal Q of the flip-flop 58 thus changes from HIGH to LOW at time t2. The AND gate 41 thus stops to supply the clock signal WCK to the memory write address counter 42, thus bringing the counting operation of the counter 42 to a stop. Further, the output signal of the terminal /Q of the D-type flip-flop 58 changes into HIGH at time t2, to be supplied to the data terminal D.

On the contrary, the counting operation of the memory read address counter 45 is being carried out continuously without pause. Then, at time t3, when the read address RAD becomes identical to the write address WAD, the comparator 40 outputs the equalization pulse EQ. Therefore, the D-type flip-flop 58 outputs a write enable signal WEN of high level at time t3 from its output terminal Q. In response to the signal WEN, the AND gate 41 supplies the reference signal CK1 from the controller 37 to the memory write address counter 42 as the clock signal WCK.

In response to the clock signal WCK, the memory write address counter 37 starts its counting operation again from time t3. In the example shown in FIG. 18A, by the counting operation of the counter 42, the output write addresses WAD change along a broken straight line connecting points "g2", "h2", "i2", "j2", . . . . On the other hand, the memory read address counter 45 outputs read addresses RAD at all times changing cyclically between the head and the last addresses of the memory 38. Here, the write address WAD at the point "g2" at the time t3 when the memory write address counter 37 restarted its counting operation is the same as the write address WAD at the point "f2" at time t2 when the counter 37 previously stopped its counting operation.

Next, at time t4, when the large sound period changes into the small sound period in which the small sound-state signal SM shown in FIG. 18B output from the small sound detector 36 changes from LOW to HIGH, the monostable multivibrator 52 is triggered by the signal SM of high level, to output the pulse SMu shown in FIG. 18C. The pulse SMu output at time t4 is supplied to the reset terminal R of the D-type flip-flop 58. In response to the pulse SMu, the flip-flop 58 is reset at time t4, thus changing the write enable signal WEN shown in FIG. 181 so far output from the terminal Q of the flip-flop 58 from HIGH to LOW at time t4. In response to the signal WEN of low level, at time t4, the AND gate 41 stops to supply the clock signal WCK to the memory write address counter 42, to bring the counting operation to a stop at time t4.

Next, in FIG. 18B, at time t5 from which the large sound period starts, the small sound-state signal SM output from the small sound detector 36 changes from HIGH (indicating small sound or silent) to LOW (indicating large sound or significant sound). The signal output from the inverter 49 thus changes from LOW to HIGH to trigger the monostable multivibrator 50. Then, at time t5, the multivibrator 50 generates the pulse SMd as shown in FIG. 18D, which is given to the D-type flip-flop 58 via OR gate 51 as the set signal Ps2 shown in FIG. 18H, and also to the reset terminal R of the set/reset flip-flop 48.

In response to the set signal Ps2, at time t5, the D-type flip-flop 58 outputs the write enable signal WEN of high level from its output terminal Q, to supply it to the AND gate 41. Then, the AND gate 41 supplies the clock signal WCK to the memory write address counter 42, which is activated so as to restart the counting operation at time t5.

The write address WAD at time t5 is located at the point "k2" the same as the write address WAD located at the point "j2" at time t4.

The write addresses WAD output from the memory write address counter 42 by the restarted counting operation change along the broken straight line connecting points "k2", "12", "m2" and "n2".

On the other hand, the pulse SMd output from the monostable multivibrator 50 at time t5 is supplied to the reset terminal R of the set/reset flip-flop 48. However, since, at time t5, the flip-flop 48 has not yet set, the pulse SMd does not change the operating mode of the flip-flop 48, thus leaving the high level status of the terminal /Q as it is even at time t5.

Then, at time t6 where the small sound period started, the small sound-state signal SM changes from LOW (indicating large or significant sound) to HIGH (indicating small sound or silent) to trigger the monostable multivibrator 52 at time t6. Then, at time t6, the multivibrator 52 generates the pulse SMu shown in FIG. 18C, to supply it to the reset terminal R of the D-type flip-flop 58.

In response to the pulse SMu, at time t6, the flip-flop 58 is reset to change the write enable signal WEN output from the terminal Q from HIGH to LOW. The AND gate 41 is then stops to supply the clock signal WCK to the memory write address counter 42, thus interrupting the counting operation thereof at time t6.

Even after time t6 where the counting operation of the memory write address counter 42 was brought to a stop, since the address of the memory read address counter 45 is advancing, at time t7, the read address RAD catches up with the stopped write address WAD at the point "o2". Therefore, at time t7, the comparator 40 supplies the equalization pulse EQ of high level as shown in FIG. 18E to the AND gate 46. As described previously with reference to FIG. 14A to 14K, the period from time t6 to t9 is the small sound period. Thus, at time t7, the small sound-state signal SM shown in FIG. 18B output from the small sound detector 36 is HiGH. And, then, the AND gate 46 outputs the pulse PW as shown in FIG. 18F. The pulse PW is supplied to the set terminal S of the D-type flip-flop 58 as the set signal Ps2 shown in FIG. 18H via OR gate 51 and also to the set terminal S of the set/reset flip-flop 48.

In response to the set signal Ps2, the D-type flip-flop 58 outputs the write enable signal WEN from its output terminal Q to supply it to the AND gate 41. The signal WEN is output at time t7 in spite of the fact that the time t7 is within the small sound period started from time t6. In response to the signal WEN, the AND gate 41 supplies the clock signal WCK to the memory write address counter 42. Thus, the counter 42 restarts its counting operation at time t7. Here, the write address WAD at time t7 is located at the point "o2" the same as the write address WAD located at the point "n2" at time t6.

On the other hand, at time t7, in response to the set signal Ps2 shown in FIG. 18H, the set/reset flip-flop 48 is set to output the signal Pwt of low level shown in FIG. 18J from its terminal /Q.

Here, at time t7 when the write and the read addresses WAD and RAD become identical to each other, the equalization pulse EQ of high level output from the comparator 40 is supplied to the clock terminal of the D-type flip-flop 58. However, since higher priority is given to the set operation of the D-type flip-flop 58, the equalization pulse EQ is neglected at time t7.

By the counting operation of the memory write address counter 42 restarting at time t7, the write addresses WAD output from the counter 42 change along the broken straight line connecting points "o2", "p2", "q2", "r2", "s2" and "t2 ". And, at time t8, the write and read addresses WAD and RAD become identical to each other at the point "t2 ", thus the comparator 40 outputting an equalization pulse EQ of high level and supplying it to the AND gate 46. As described previously, the time period from time t6 to t9 belongs to the small sound period, the small sound-state signal SM output from the small sound detector 36 is HIGH at time t8 in the small sound period, thus the AND gate 46 outputting the set pulse Pw as shown in FIG. 18F at time t8.

The pulse Pw is supplied to the set terminal S of the D-type flip-flop 58 as the set signal Ps2 shown in FIG. 18H via OR circuit 51 and also to the set terminal S of the set/reset flip-flop 48.

However, since the flip-flop 48 has been already set at time t7, even at time t8, the flip-flop 48 continues to output the signal Pwt of low level shown in FIG. 18J from its output terminal /Q. And, at time t8, when the write and read addresses WAD and RAD become identical to each other, the equalization pulse EQ of high level output from the comparator 40 is supplied to the clock terminal of the D-type flip-flop 58. However, in this case also, since higher priority is given to the set operation of the D-type flip-flop 58, the equalization pulse EQ is neglected at time t8.

Therefore, even at time t8, in response to the set signal Ps2 shown in FIG. 18H supplied from the OR gate 51, the D-type flip-flop 58 outputs the write enable signal WEN from its output terminal Q to supply it to the AND gate 41. The signal WEN is output regardless of the fact that time t8 is in the small sound period starting from time t6.

Then, the AND gate 41 supplies the clock signal WCK to the memory write address counter 42, thus maintaining the counting operation thereof restarting at time t7 even after time t8. Therefore, the write addresses WAD at time t8 and on change along the broken straight line connecting the points "t2 ", "u2", "v2", "w2".

Then, at time t9, when the small sound-state signal SM output from the small sound detector 36 is changed from HIGH (indicating small sound or silent) to LOW (indicating large sound or significant sound), the signal so far output from the inverter 49 is changed from LOW to HIGH. Thus, the monostable multivibrator 50 is triggered to output the pulse SMd shown in FIG. 18D at time t9. The pulse SMd is supplied to the reset terminal R of the set/reset flip-flop 48 to reset thereof at time t9. The pulse Pwt shown in FIG. 18J output from the terminal /Q of the flip-flop 48 is changed from LOW to HIGH at time t9 to trigger the monostable multivibrator 47 so as to output a pulse PRx at time t9.

At time t9, the pulse PRx is supplied to the preset terminal PRT of the memory write address counter 42 as the preset signal PR via OR gate 44. In response to the preset signal PR, the counter 42 forcibly changes the write address WAD at time t9 as shown by an upward arrow connecting points "W2" and "x2", so as to make the write address WAD become identical to the read address RAD at time t9.

The pulse SMd output from the monostable multivibrator 50 is supplied to the set terminal S of the D-type flip-flop 58 as the set signal Ps2 via OR gate 51. However, as described previously, the flip-flop 58 has already been set before time t9, the write enable signal WEN of high level is continuously output from the output terminal Q of the flip-flop 58.

This causes the AND gate 41 to continuously supply the clock signal WCK to the memory write address counter 42 even after time t9. Therefore, the counter 42 continuously write address WAD from the forcibly changed address WAD located at the point "x2".

By the counting operation of the memory write address counter 42 at time t9 and on, the write addresses WAD output therefrom change along the broken straight WAD connecting points "w2", "x2", "y2", "z2", "a2'", "b2'", . . . Here, at time t9, when the write address WAD is forcibly made to become identical to the read address RAD, the equalization pulse EQ output from the comparator 40 is also supplied to the clock terminal of the D-type flip-flop 58. However, since the flip-flop 58 gives the first priority to the set operation, the equalization pulse EQ supplied to the clock terminal of the flip-flop 58 at time t7 is neglected.

According to the seventh embodiment, as described above, in such a small sound period from time t6 to t9 shown in FIG. 18A when small sound or silent status continues for a long time, audio signals of small level are written in the memory 38 even in the intermediate period from t7 to t9 in the small sound period. Thus, sound can be prevented from being interrupted even in case of long small sound period.

However, if the reproduced image deviates from the the reproduced sound at time t9 when the small sound period is changed to the large sound period, the deviation often tends to make viewers feel a sense of incompatibility.

Therefore, the audio signal processor according to the invention makes such an operational control as follows:

When a small sound period, such as a period from t7 to t9 in FIG. 18A, during which an audio signal of small signal level is written into the memory 38, is changed into a large sound period, At the very timing t9, the write address WAD is forcibly changed so as to completely or closely agree with the read address RAD. And then, the write addresses WAD are changed along a broken straight line WAD connecting points "w2", "x2", "y2z", "z2", , , .

This enforced change according to the invention can bring the reproduced image on VTR into perfect accord with the reproduced sound in the case when small level sound has suddenly changed into large level sound, thus eliminating the sense of incompatibility.

What is claimed is:

1. An apparatus for processing audio signals comprising:

a memory for storing the audio signals;

writing means for writing the audio signals in the memory at write addresses in the memory;

reading means for reading the audio signals in accordance with reading addresses from the memory at a speed lower than a speed for writing the audio signals into the memory by the writing means;

first detecting means for detecting an amount of audio signals stored in the memory and not yet read by the reading means;

first determining means for determining whether the detected amount of audio signals stored in the memory and not yet read by the reading means is increasing between a predetermined lower amount limit range and a predetermined upper amount limit range;

first updating means for updating the write addresses when the amount of audio signals not yet read by the reading means is increasing;

second updating means for cyclically updating the read addresses between head and last addresses of the memory;

second detecting means for detecting small audio signals among the audio signals, levels of the small audio signals being lower than a reference level, and generating a detection signal indicating the small audio signal;

halting means responsive to the detection signal for halting the updating of the write addresses of the small audio signals when the levels of the small audio signals are lower than the reference level and generating a detection signal; and starting means for restarting the updating of the write addresses when the read addresses become identical to the write addresses at which the updating was halted.

2. The apparatus according to claim 1 further comprising presetting means for presetting the write and the read addresses and the amount of audio signals supplied to the first determining means per predetermined audio signal amount.

3. The apparatus according to claim 1 further comprising presetting means for presetting the write and the read addresses and the supplied amount of audio signals when the amount of audio signals enters the predetermined lower amount limit range.

4. The apparatus according to claim 1, wherein the detecting means comprises:

means for generating a reference signal having the reference level based on the audio signals such that the reference level follows levels of the audio signals; and means for comparing the audio signals and the reference signal to detect the small signals.

5. The apparatus according to claim 1 further comprising means for making the write addresses become identical to the read addresses after the updating is restarted.

6. The apparatus according to claim 1, wherein halting means halts the updating of the write address when the detected amount enters the predetermined upper amount limit range.

7. The apparatus according to claim 6 wherein the starting restarts the updating of the write addresses when the detected amount enters the predetermined lower amount limit range.

8. The apparatus according to claim 1, wherein the starting means restarts the updating of the write addresses when an amount of audio signals not yet read by the reading means enters the predetermined lower amount limit range.

9. The apparatus according to claim 8 further comprising means for making the write addresses become identical to the read addresses when levels of the audio signals becomes higher than the reference level after the updating is restarted.

10. The apparatus according to claim 1, wherein the starting means restarts the updating of the write addresses when levels of the audio signals become higher than the reference level.

11. The apparatus according to claim 10, wherein the halting means halts the updating of the write addresses when the write addresses become identical to the read addresses.

12. The apparatus according to claim 11, wherein the starting means restarts the updating of the write addresses when the read addresses become identical to the write addresses.

13. The apparatus according to claim 12 further comprising means for making the write addresses become identical to the read addresses when levels of the audio signals becomes higher than the reference level after the updating is restarted.

14. An apparatus for processing audio signals comprising:

a memory for storing the audio signals;

writing means for writing the audio signals in the memory at write addresses in the memory;

reading means for reading the audio signals in accordance with reading addresses from the memory at a speed lower than a speed for writing the audio signals into the memory by the writing means;

detecting means for detecting small audio signals among the audio signals, levels of the small audio signals being lower than a reference level and generating a detection signal indicating the small audio signal;

updating means for cyclically updating the read addresses between head and last addresses of the memory;

halting means responsive to the detection signal for halting the updating of the write address of the small audio signal when the levels of the small audio signals are lower than the reference level; and starting means for restarting the updating of the write addresses when the read addresses become identical to the write addresses at which the updating was halted.

15. The apparatus according to claim 14, wherein the detecting means comprises:

means for generating a reference signal having the reference level based on the audio signals such that the reference level follows levels of the audio signals; and means for comparing the audio signals and the reference signal to detect the small signals.

16. The apparatus according to claim 14 further comprising means for making the write addresses become identical to the read addresses after the updating is restarted.

* * * * *